United States Patent
Fukasawa et al.

(10) Patent No.: US 10,223,042 B2
(45) Date of Patent: Mar. 5, 2019

(54) SYSTEM, INFORMATION PROCESSING METHOD, AND STORAGE MEDIUM

(71) Applicants: Naoki Fukasawa, Kanagawa (JP); Shigeo Araki, Tokyo (JP)

(72) Inventors: Naoki Fukasawa, Kanagawa (JP); Shigeo Araki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 41 days.

(21) Appl. No.: 15/441,609

(22) Filed: Feb. 24, 2017

(65) Prior Publication Data

US 2017/0160995 A1 Jun. 8, 2017

Related U.S. Application Data

(63) Continuation of application No. PCT/JP2015/074898, filed on Sep. 1, 2015.

(30) Foreign Application Priority Data

Sep. 1, 2014 (JP) .................. 2014-177556
Jun. 26, 2015 (JP) .................. 2015-129228

(51) Int. Cl.
*G06F 3/12* (2006.01)
*G06F 8/61* (2018.01)

(52) U.S. Cl.
CPC .......... *G06F 3/1204* (2013.01); *G06F 3/1225* (2013.01); *G06F 3/1288* (2013.01); *G06F 3/1289* (2013.01); *G06F 8/61* (2013.01)

(58) Field of Classification Search
USPC ........................................................ 358/1.15
See application file for complete search history.

(56) References Cited

U.S. PATENT DOCUMENTS

2003/0131072 A1 7/2003 Kobayashi
2004/0015959 A1 1/2004 Kobayashi
(Continued)

FOREIGN PATENT DOCUMENTS

JP 2001-117834 4/2001
JP 2003-173246 6/2003
(Continued)

OTHER PUBLICATIONS

International Search Report dated Dec. 1, 2015 in PCT/JP2015/074898 filed Sep. 1, 2015 ( with English Translation).
(Continued)

*Primary Examiner* — Neil R McLean
*Assistant Examiner* — Darryl V Dottin
(74) *Attorney, Agent, or Firm* — Oblon, McClelland, Maier & Neustadt, L.L.P.

(57) ABSTRACT

A system includes a terminal and an information processing device including a first specification unit configured to specify a second computer program based on terminal information on the terminal received from the terminal; a first provision unit configured to provide the second computer program to the terminal; and a second specification unit configured to specify a first computer program based on device information received from the terminal; and a second provision unit configured to provide the first computer program to the terminal. The terminal including a transmission unit configured to transmit the terminal information; a first processing unit configured to perform processing of acquiring device information and transmitting the acquired device information, by execution of the second computer program; and a second processing unit configured to perform processing of installing the first computer program on the terminal, by execution of the second computer program.

14 Claims, 30 Drawing Sheets

(56) References Cited

U.S. PATENT DOCUMENTS

| | | |
|---|---|---|
| 2008/0263570 A1 | 10/2008 | Fukasawa |
| 2009/0251728 A1 | 10/2009 | Fukasawa |
| 2010/0225946 A1 | 9/2010 | Fukasawa |
| 2010/0238494 A1 | 9/2010 | Araki |
| 2010/0318984 A1 | 12/2010 | Araki |
| 2011/0058205 A1 | 3/2011 | Araki |
| 2011/0058219 A1 | 3/2011 | Fukasawa |
| 2011/0075177 A1* | 3/2011 | Takagi ............... G06F 3/1204 358/1.13 |
| 2012/0110213 A1* | 5/2012 | Abe .................... G06F 3/1204 710/10 |
| 2012/0250085 A1* | 10/2012 | Kitagawa ........... G06F 3/1204 358/1.15 |
| 2012/0268782 A1* | 10/2012 | Hamaguchi ......... G06F 3/1204 358/1.15 |
| 2012/0268783 A1* | 10/2012 | Nakahara ........... G06K 15/1805 358/1.15 |
| 2012/0293833 A1 | 11/2012 | Fukasawa |
| 2013/0063746 A1 | 3/2013 | Araki |
| 2013/0232239 A1 | 9/2013 | Akiyama |
| 2013/0246777 A1 | 9/2013 | Fukasawa |
| 2014/0204421 A1 | 7/2014 | Araki |
| 2014/0293312 A1 | 10/2014 | Fukasawa |

FOREIGN PATENT DOCUMENTS

| | | |
|---|---|---|
| JP | 2004-086863 | 3/2004 |
| JP | 2007-086969 | 4/2007 |
| JP | 2009-217318 | 9/2009 |
| JP | 2012-048565 | 3/2012 |
| JP | 2012-194640 | 10/2012 |
| JP | 2013-182563 | 9/2013 |

OTHER PUBLICATIONS

Written Opinion dated Dec. 1, 2015 in PCT/JP2015/074898, filed on Sep. 1, 2015.

* cited by examiner

FIG.8

| ID | DISPLAY NAME | VERSION | UPDATE DATE AND TIME | SIZE | INSTALLER IDENTIFICATION NAME | META-DATA | RE-SOURCE LOCATION | OS VERSION | ARCHI-TECTURE | LOCALE | MODEL SPECIFICATION INFORMATION |
|---|---|---|---|---|---|---|---|---|---|---|---|
| … | … | … | … | … | … | … | … | … | … | … | … |

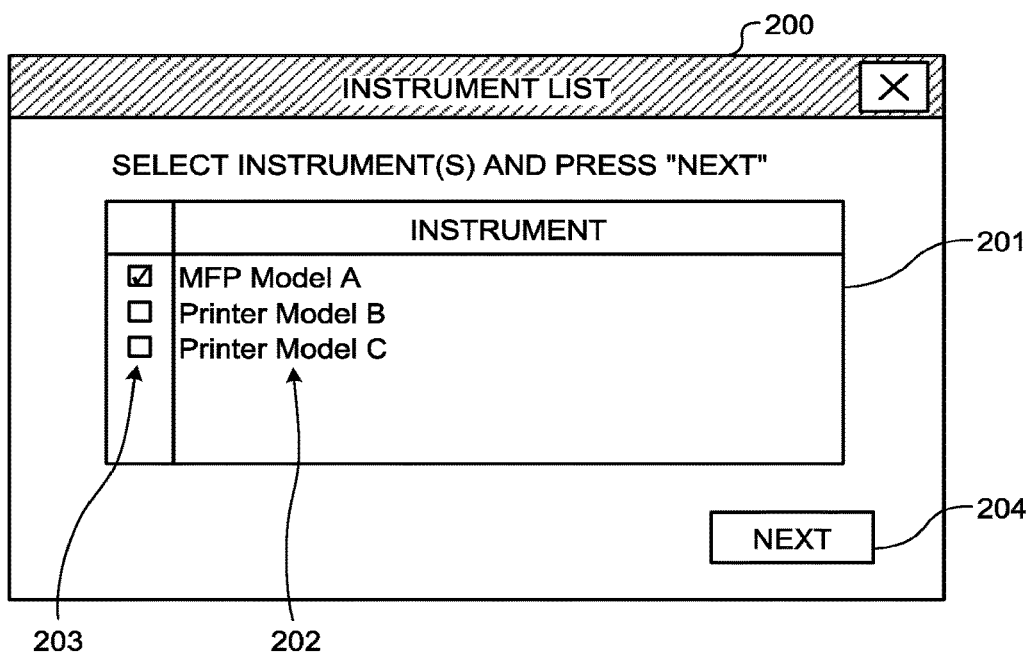

FIG.14

```
 1: [
 2:         {
 3:                         "id": "mfp_modela_printer_pcl",
 4:                         "name": "MFP Model A Printer Driver PCL",
 5:                         "version": "1.2.0.0",
 6:                         "date": "2014-02-11",
 7:                         "size": 12000,
 8:                         "installer": "printer_driver_installer",
 9:                         "metadata_url": "https://example.com/mfp_modela_printer_pcl/metadata.json",
10:                         "download_url": "https://example.com/mfp_modela_printer_pcl/object.zip"
11:         },
12:         {
13:                         "id": "mfp_modela_printer_ps",
14:                         "name": "MFP Model A Printer Driver Postscript",
15:                         "version": "1.0.0.0",
16:                         "date": "2014-01-01",
17:                         "size": 6000,
18:                         "installer": "printer_driver_installer",
19:                         "metadata_url": "https://example.com/mfp_modela_printer_ps/metadata.json",
20:                         "download_url": "https://example.com/mfp_modela_printer_ps/object.zip"
21:         },
22:         {
23:                         "id": "mfp_modela_scanner",
24:                         "name": "MFP Model A Scanner Driver",
25:                         "version": "1.0.0.0",
26:                         "date": "2014-01-01",
27:                         "size": 5000,
28:                         "installer": "scanner_driver_installer",
29:                         "download_url": "https://example.com/mfp_modela_scanner/object.zip"
30:         },
31:         {
32:                         "id": "mfp_modela_fax",
33:                         "name": "MFP Model A Fax Driver",
34:                         "version": "1.0.0.0",
35:                         "date": "2014-01-01",
36:                         "size": 7000,
37:                         "installer": "printer_driver_installer",
38:                         "download_url": "https://example.com/mfp_modela_fax/object.zip"
39:         },
40:         {
41:                         "id": "common_printer",
42:                         "name": "Common Printer Driver",
43:                         "version": "2.1.0.0",
44:                         "published_date": "2013-01-01",
45:                         "size": 23000,
46:                         "installer": "printer_driver_installer",
47:                         "download_url": "https://example.com/common_printer/object.zip"
48:         },
49:         {
50:                         "id": "mfp_management_utility",
51:                         "name": "MFP Management Utility",
52:                         "version": "2.0.0.0",
53:                         "published_date": "2014-02-01",
54:                         "size": 10000,
55:                         "installer": "application_installer",
56:                         "metadata_url": "https://example.com/mfp_management_utility/metadata.json",
57:                         "download_url": "https://example.com/mfp_management_utility/object.zip"
58:         },
59:         {
60:                         "id": "printer_driver_installer",
61:                         "name": "Printer Driver Installer",
62:                         "version": "2.0.0.0",
63:                         "published_date": "2014-02-01",
64:                         "size": 6000,
65:                         "installer": "installer_manager",
66:                         "download_url": "https://example.com/printer_driver_installer/object.zip"
67:         }
68: ]
```

FIG.15

```
1:  {
2:          "model_names": [
3:                          "MFP Model A type 1 Printer Driver PCL",
4:                          "MFP Model A type 2 Printer Driver PCL",
5:                          "MFP Model A type 3 Printer Driver PCL"
6:          ]
7:  }
```

FIG.16

```
1: {
2:   "initial_registry": {
3:     "current_version": {
4:       "type": "REG_SZ",
5:       "value": "1.0.0.0"
6:     },
7:     "cache_path": {
8:       "type": "REG_SZ",
9:       "value":"${CommonApplicationData}/MFP_Management_Utility"
10:    }
11:  }
12: }
```

FIG.17

| PROGRAM | INSTALLED VERSION | LATEST VERSION | DETERMINATION RESULT |
|---|---|---|---|
| MFP Model A type 1 Printer Driver PCL | - | 1.2.0.0 | YES |
| MFP Model A type 2 Printer Driver PCL | 1.1.0.0 | 1.2.0.0 | YES |
| MFP Model A type 3 Printer Driver PCL | - | 1.2.0.0 | YES |
| MFP Model A Scanner Driver | 1.0.0.0 | 1.0.0.0 | NO |
| MFP Model A Fax Driver | 1.0.0.0 | 1.0.0.0 | NO |
| Common Printer Driver | 2.1.0.0 | 2.1.0.0 | NO |
| MFP Management Utility | - | 2.0.0.0 | YES |
| Printer Driver Installer | 1.0.0.0 | 2.0.0.0 | YES |

FIG.21

```
 1: [
 2:   {
 3:     "id": "portmonitor_filter_a",
 4:     "name": "PortMonitor Filter A",
 5:     "version": "1.0.0.0",
 6:     "publiched_date": "2014-03-01",
 7:     "size": 12345,
 8:     "installer": "portmonitor_installer",
 9:     "download_url": "https://example.com/portmonitor_filter_a/object.zip"
10:   },
11:   {
12:     "id": "portmonitor_installer",
13:     "name": "PortMonitor Installer",
14:     "version": "1.0.0.0",
15:     "publiched_date": "2014-03-01",
16:     "size": 5555,
17:     "installer": "installer_manager",
18:     "download_url": "https://example.com/portmonitor_installer/object.zip"
19:   }
20: ]
```

| PROGRAM | INSTALLED VERSION | LATEST VERSION | DETERMINATION RESULT |
|---|---|---|---|
| PortMonitor Filter A | - | 1.0.0.0 | YES |
| PortMonitor Installer | - | 1.0.0.0 | YES |

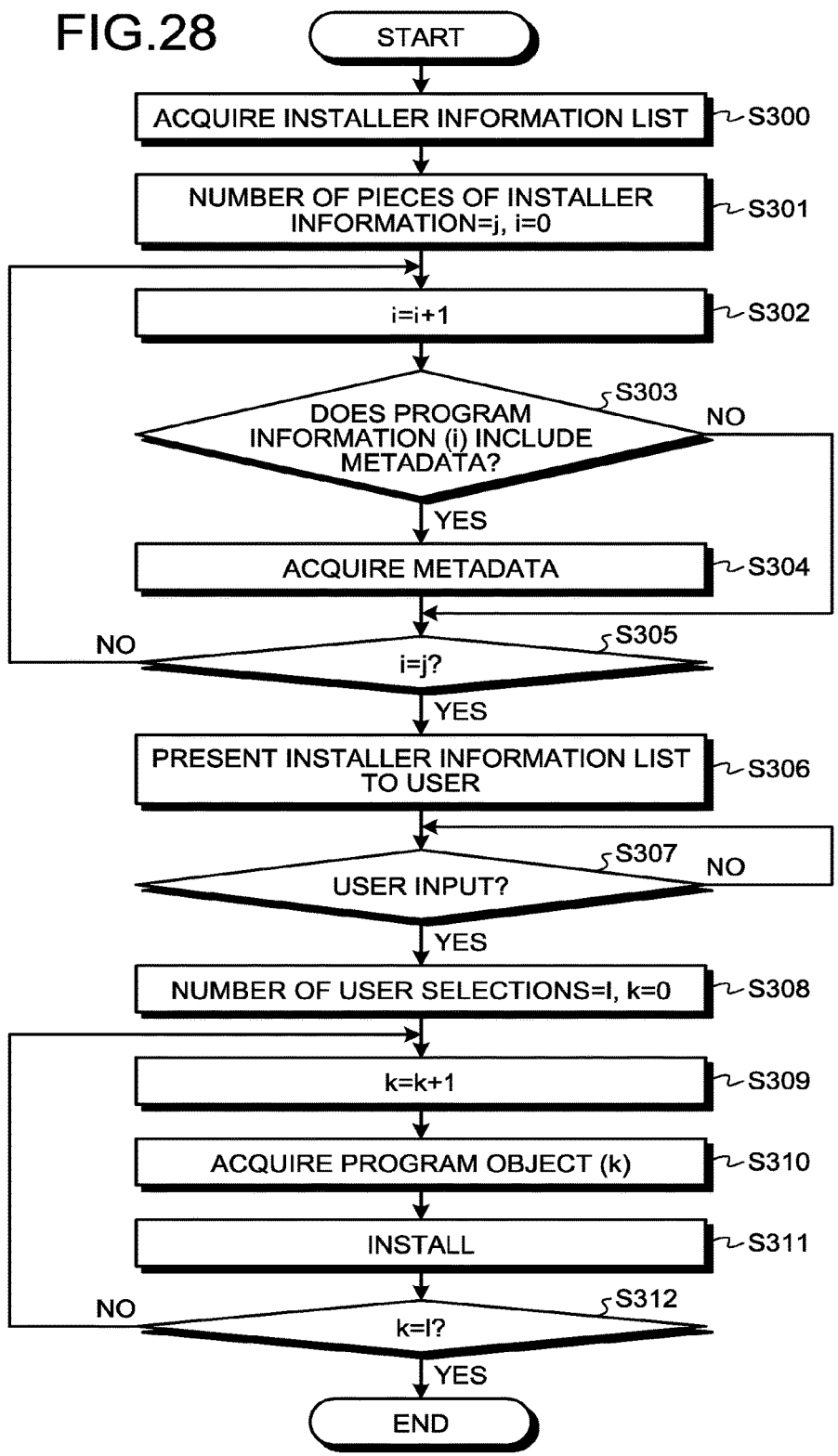

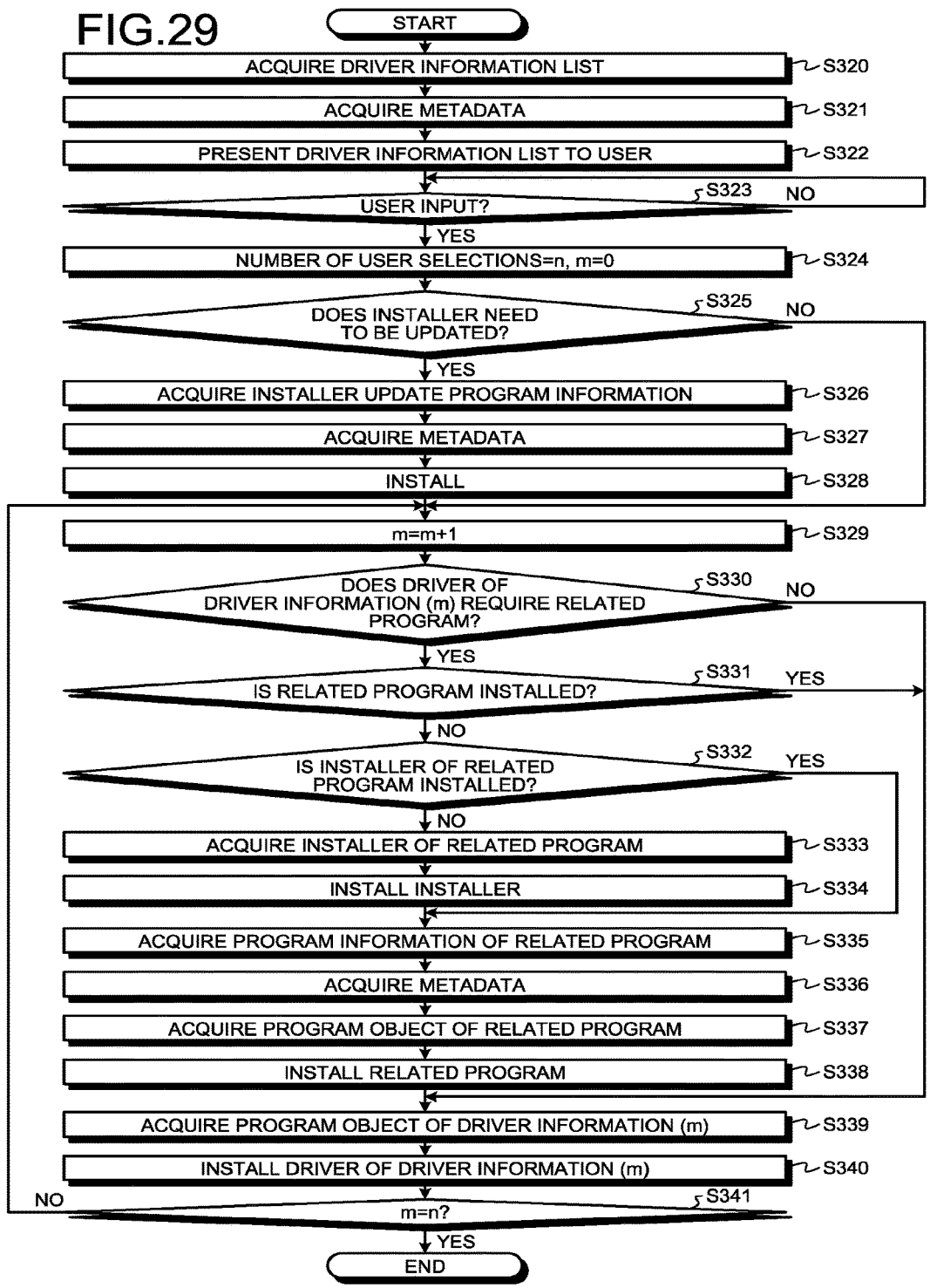

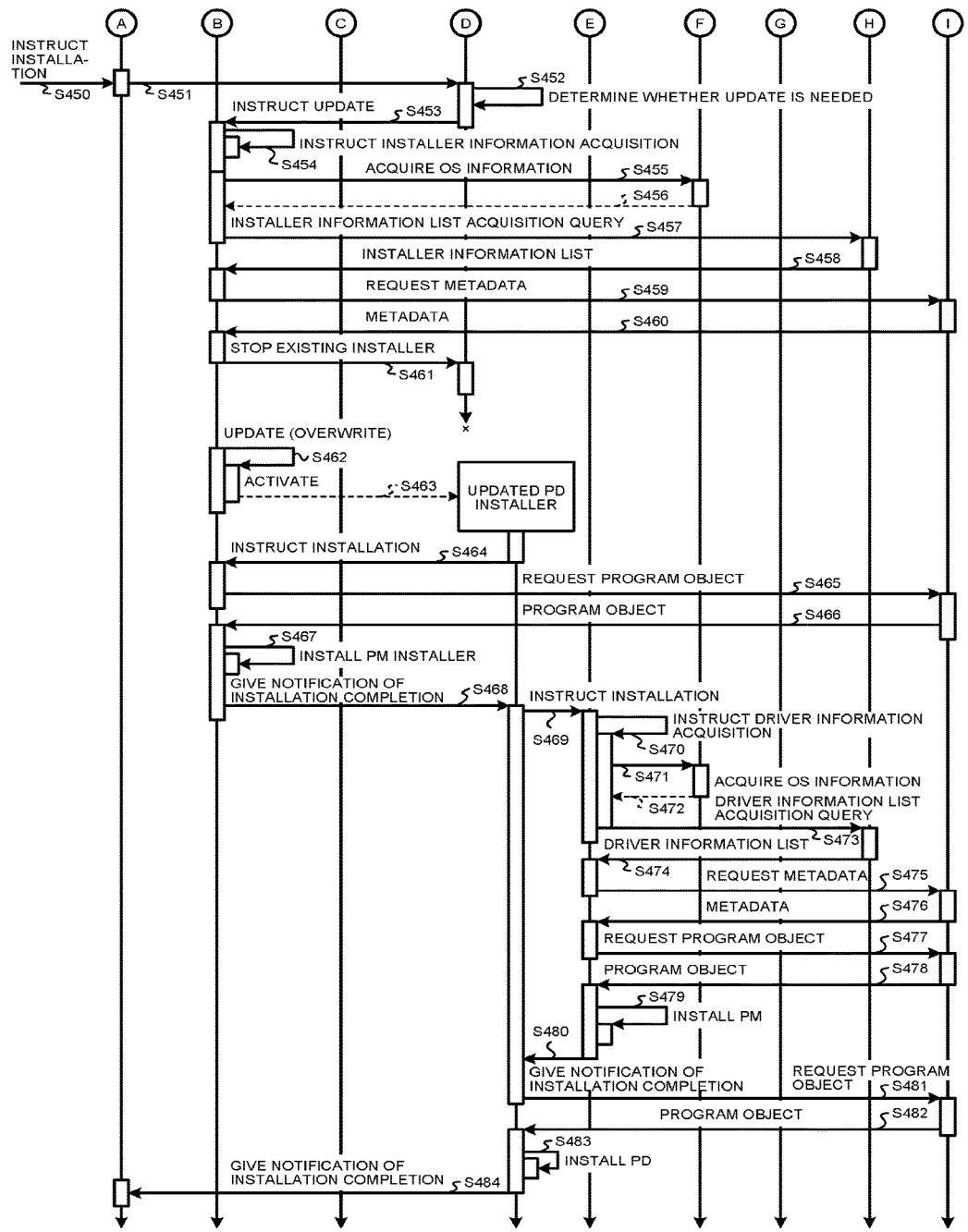

FIG.31

```
 1: {
 2:         "installer": "installer_manager",
 3:         "peripheral": {
 4:                     "pnp_id": "MFP Model A"
 5:         },
 6:         "system": {
 7:                     "version": "6.1.7601.65536",
 8:                     "architecture": "x64",
 9:                     "locale": "ja-JP"
10:         }
11: }
```

FIG.32

```
1: [
2:     {
3:         "id": "printer_driver_installer",
4:         "name": "Printer Driver Installer",
5:         "version": "1.0.0.0",
6:         "published_date": "2014-01-01",
7:         "size": 6000,
8:         "installer": "installer_manager",
9:         "download_url": "https://example.com/printer_driver_installer/object.zip"
10:    },
11:    {
12:        "id": "portmonitor_installer",
13:        "name": "PortMonitor Installer",
14:        "version": "1.0.0.0",
15:        "published_date": "2014-01-01",
16:        "size": 5555,
17:        "installer": "installer_manager",
18:        "download_url": "https://example.com/portmonitor_installer/object.zip"
19:    },
20:    {
21:        "id": "application_installer",
22:        "name": "Application Installer",
23:        "version": "1.0.0.0",
24:        "published_date": "2014-01-01",
25:        "size": 6000,
26:        "installer": "installer_manager",
27:        "download_url": "https://example.com/application_installer/object.zip"
28:    },
29:    {
30:        "id": "scanner_driver_installer",
31:        "name": "ScannerDriver Installer",
32:        "version": "1.0.0.0 ",
33:        "published_date": "2014-01-01",
34:        "size": 6000,
35:        "installer": "installer_manager",
36:        "download_url": "https://example.com/scanner_driver_installer/object.zip"
37:    }
38: ]
```

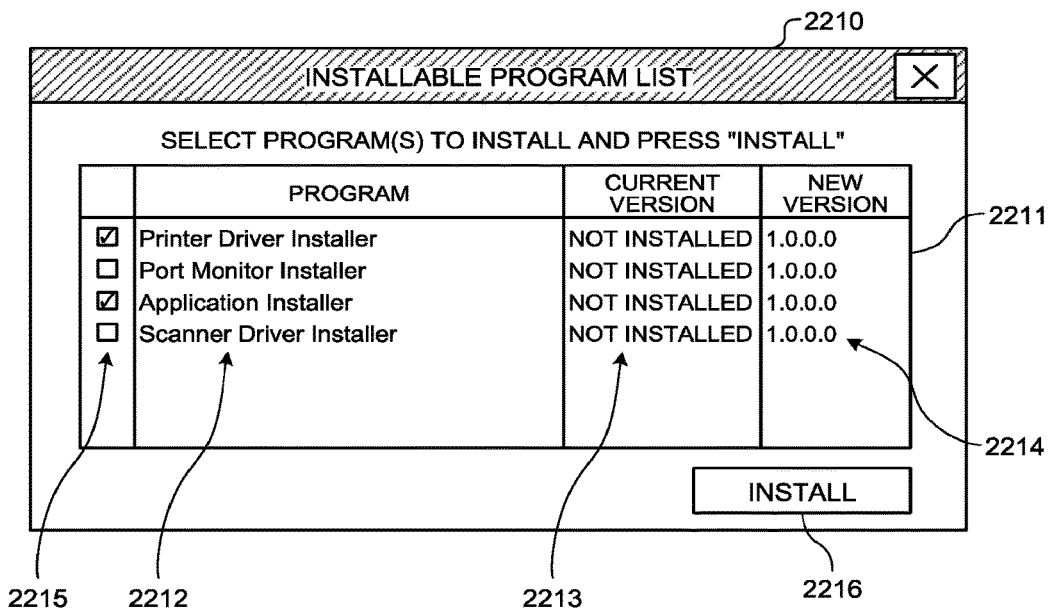

FIG.35

```
1: [
2:      {
3:              "id": "mfp_modela_printer_pcl",
4:              "name": "MFP Model A Printer Driver PCL",
5:              "version": "1.2.0.0",
6:              "date": "2014-02-11",
7:              "size": 12000,
8:              "installer": "printer_driver_installer",
9:              "metadata_url":"https://example.com/mfp_modela_printer_pcl/metadata.json",
10:             "download_url":"https://example.com/mfp_modela_printer_pcl/object.zip"
11:     }
12: ]
```

FIG.36

```
1: {
2:      "model_names": [
3:              "MFP Model A type 1 Printer Driver PCL",
4:              "MFP Model A type 2 Printer Driver PCL",
5:              "MFP Model A type 3 Printer Driver PCL"
6:      ]
7:      "requirement": {
8:              "printer_driver_installer":{"version":2.0.0.0},
9:              "portmonitor_filter_a":{
10:                     "version":"1.0.0.0",
11:                     "installer":"portmonitor_installer"}
12:     }
13: }
```

FIG.38

```
[
    {
        "id": "printer_driver_installer",
        "name": "Printer Driver Installer",
        "version": "2.0.0.0",
        "publiched_date": "2014-01-02",
        "size": 6100,
        "installer": "installer_manager",
        "download_url": "https://example.com/printer_driver_installer/object.zip"
    },
    {
        "id": "portmonitor_installer",
        "name": "PortMonitor Installer",
        "version": "1.0.0.0",
        "publiched_date": "2014-01-01",
        "size": 5555,
        "installer": "installer_manager",
        "download_url": "https://example.com/portmonitor_installer/object.zip"
    },
    {
        "id": "application_installer",
        "name": "Application Installer",
        "version": "1.0.0.0",
        "publiched_date": "2014-01-01",
        "size": 6000,
        "installer": "installer_manager",
        "download_url": "https://example.com/application_installer/object.zip"
    },
    {
        "id": "scanner_driver_installer",
        "name": "ScannerDriver Installer",
        "version": "1.0.0.0",
        "publiched_date": "2014-01-01",
        "size": 6000,
        "installer": "installer_manager",
        "download_url": "https://example.com/scanner_driver_installer/object.zip"
    }
]
```

FIG.39

```
1: {
2:         "id": "portmonitor_filter_a",
3:         "peripheral": {
4:                   "pnp_id": "MFP Model A"
5:         },
6:         "system": {
7:                   "version": "6.1.7601.65536",
8:                   "architecture": "x64",
9:                   "locale": "ja-JP"
10:        }
11: }
```

FIG.40

```
1: [
2:      {
3:          "id": "portmonitor_filter_a",
4:          "name": "PortMonitor Filter A",
5:          "version": "1.0.0.0",
6:          "date": "2014-01-2",
7:          "size": 12000,
8:          "installer": "portmonitor_installer",
9:          "metadata_url":"https://example.com/mfp_modela_printer_pcl/metadata.json",
10:         "download_url":"https://example.com/mfp_modela_printer_pcl/object.zip"
11:     }
12: ]
```

SYSTEM, INFORMATION PROCESSING METHOD, AND STORAGE MEDIUM

CROSS-REFERENCE TO RELATED APPLICATIONS

This application is a continuation of PCT international application Ser. No. PCT/JP2015/074898 filed on Sep. 1, 2015 which designates the United States, and which claims the benefit of priority from Japanese Patent Application No. 2014-177556, filed on Sep. 1, 2014 and Japanese Patent Application No. 2015-129228, filed on Jun. 26, 2014; the entire contents of which are incorporated herein by reference.

BACKGROUND OF THE INVENTION

1. Field of the Invention

The present invention relates to a system, an information processing method, and a storage medium.

2. Description of the Related Art

To allow an imaging instrument such as a printer device to be used by an information processing device such as a personal computer, a driver program for controlling the imaging instrument needs to be installed on the information processing device. A conventionally known installer collects model identification information of the imaging instrument, and system environment information on, for example, the operating system (OS) of the information processing device, searches and acquires a driver program based on the collected information, and then installs the driver program.

For example, Japanese Patent Application Laid-open No. 2007-086969 discloses a technique in which system information of a client is acquired, any usable printer driver is acquired based on the acquired system information and unique information of a printing device stored in a printer information storage unit, and install information on installation of the printer driver based on the unique information is transmitted to the client.

The use of such an installer allows a user to easily execute installation of a driver program suitable for the imaging instrument and system environment, such as the operating system (OS), of the information processing device.

SUMMARY

Technical Problem

The imaging instrument is provided with an application program such as a utility program for more conveniently using the imaging instrument in some cases. Typically, such an application program is provided separately from a driver program, and installation methods for the application program and the driver program are different from each other. The driver program and the application program are typically acquired from different sources.

Conventionally, it has been difficult to acquire and install, through one installer, a plurality of computer programs, installation methods thereof are different from each other. Thus, the user needs to acquire a driver program and a utility program for one imaging instrument and then install the programs using corresponding installers, which results in a cumbersome procedure.

SUMMARY OF THE INVENTION

According to one aspect of the present invention, a system includes one or more terminals, and an information processing device connectable with the one or more terminals through a network, and configured to provide one or more first computer programs configured to allow the one or more terminals to execute processing on a device connected with the one or more terminals through the network. The information processing device includes a storage unit, a first specification unit, a first provision unit, a second specification unit, and a second provision unit. The storage unit is configured to store the one or more first computer programs and one or more second computer programs each executed by a terminal of the one or more terminals to transmit device information on the device to the information processing device and install a first computer program provided by the information processing device, of the one or more first computer programs, on the terminal. The first specification unit is configured to specify a second computer program to be provided to a terminal of the one or more terminals, of the one or more second computer programs based on terminal information on the terminal received from the terminal. The first provision unit is configured to provide the second computer program specified by the first specification unit to the terminal. The second specification unit is configured to specify a first computer program to be provided to the terminal, of the one or more first computer programs based on device information received from the terminal, by the terminal executing the second computer program. The second provision unit is configured to provide the first computer program specified by the second specification unit to the terminal. The terminal includes a transmission unit, a first processing unit, and a second processing unit. The transmission unit is configured to transmit the terminal information to the information processing device. The first processing unit is configured to perform processing of acquiring the device information and transmitting the acquired device information to the information processing device. The second processing unit is configured to perform processing of installing the first computer program provided by the information processing device, on the terminal.

BRIEF DESCRIPTION OF THE DRAWINGS

FIG. 8 is a diagram illustrating an exemplary configuration of records in a database stored in a dynamic server according to the first embodiment;

FIG. 12 is a diagram illustrating an exemplary instrument list display screen according to the first embodiment;

FIG. 13 is a diagram illustrating an exemplary query to be transmitted to the dynamic server, applicable to the first embodiment;

FIG. 14 is a diagram illustrating an exemplary program information list transmitted from the dynamic server according to the first embodiment;

FIG. 15 is a diagram illustrating an exemplary configuration of metadata according to the first embodiment;

FIG. 16 is a diagram illustrating an exemplary configuration of metadata according to the first embodiment;

FIG. 17 is a diagram for description of a method of determining a computer program to be installed according to the first embodiment;

FIG. 21 is a diagram illustrating an exemplary program information list for description of processing according to the second embodiment;

FIG. 28 is an exemplary flowchart for more detailed description of installation processing according to the third embodiment;

FIG. 29 is an exemplary flowchart for more detailed description of the installation processing according to the third embodiment;

FIG. 30B is a sequence diagram illustrating the exemplary processing at the entire information processing system in the installation processing according to the third embodiment;

FIG. 31 is a diagram illustrating an exemplary query applicable to the third embodiment produced by an installer manager and transmitted to the dynamic server;

FIG. 32 is a diagram illustrating an exemplary installer information list transmitted from the dynamic server according to the third embodiment;

FIG. 33 is a diagram illustrating an exemplary installable program installer list display screen according to the third embodiment;

FIG. 34 is a diagram illustrating an exemplary query applicable to the third embodiment produced by a PD installer and transmitted to the dynamic server;

FIG. 35 is a diagram illustrating an exemplary driver information list returned to the PD installer according to the third embodiment;

FIG. 36 is a diagram illustrating exemplary metadata applicable to the third embodiment transmitted to the PD installer;

FIG. 38 is a diagram illustrating an exemplary installer information list acquired from the dynamic server according to the third embodiment;

FIG. 39 is a diagram illustrating an exemplary query applicable to the third embodiment produced by a PM installer and transmitted to the dynamic server; and FIG. 40 is a diagram illustrating an exemplary driver information list according to the third embodiment;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
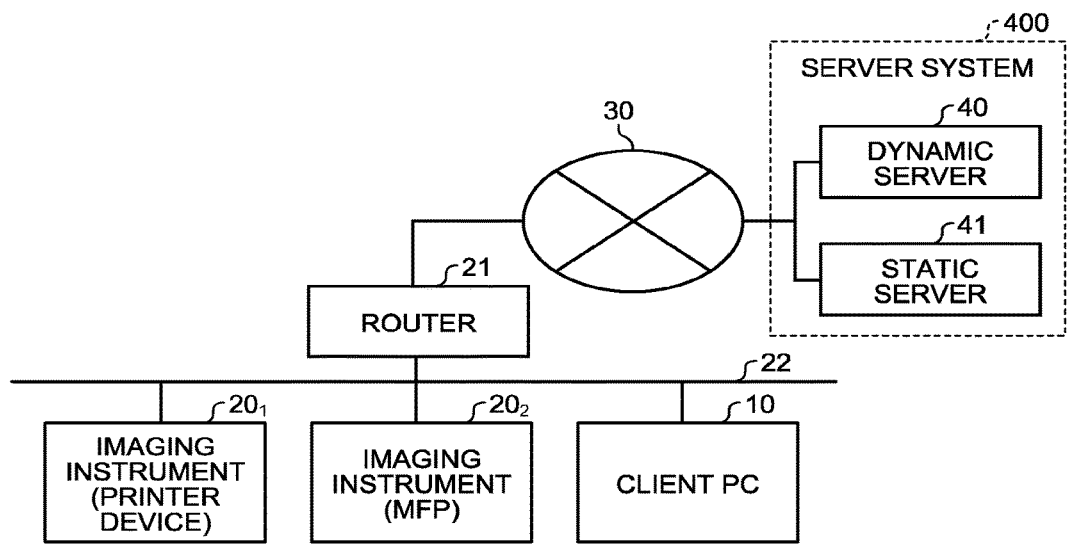
FIG. 1 is a block diagram of an exemplary configuration of an information processing system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A detailed explanation is given below of the present invention using the embodiments that are illustrated in the drawings. Here, components, types, combinations, shapes, relative arrangements, or the like, described in the embodiments are only examples for explanation unless otherwise specified, and there is no intention to limit the scope of the present invention thereto.

Embodiments of a system, an information processing method, and a storage medium will be described in detail below with reference to the accompanying drawings.

An embodiment has an object to facilitate installation of a plurality of computer programs, installation methods of which are different from each other.

First Embodiment

FIG. 1 illustrates an exemplary configuration of an information processing system according to a first embodiment.

In FIG. 1, an information processing device 10 (hereinafter referred to as a client PC 10) such as a personal computer at a client side and imaging instruments 201 and 202 are connected with each other through a network 22 such as a local area network (LAN) to perform communication therebetween. In the example illustrated in FIG. 1, the imaging instruments 201 and 202 are a printer device and a multi function printer (MFP), respectively. The MFP is a multifunctional imaging instrument that achieves a plurality of functions such as a printer function, a scanner function, a copying function, and a facsimile function in one body.

Driver programs for controlling the imaging instruments 201 and 202 are mounted on the client PC 10. A driver is mounted on the client PC 10 for each function of the imaging instrument 202 as an MFP having a plurality of functions. The client PC 10 can control the imaging instruments 201 and 202 through the network 22 using the mounted driver programs.

In addition, utility programs as application programs for more conveniently using the imaging instruments 201 and 202 controlled by the driver programs can be mounted on the client PC 10. For simplicity of description, in the following, these driver programs or application programs are simply referred to as programs unless otherwise stated.

The client PC 10 is connected with an external network 30 such as the Internet through a router 21. The network 30 is connected with a server system 400 including a dynamic server 40 and a static server 41. The client PC 10 is connected with the server system 400 through the network 30 to mutually perform communication with the dynamic server 40 and the static server 41.

The driver programs and the application programs to be mounted on the client PC 10 are stored at predetermined storage places in the static server 41. Each driver program or application program stored in the static server 41 may be, for example, a driver that is to be replaced with a corresponding program mounted on the client PC 10, and the version of which is newer than of the corresponding program, or may be a module to be included in a program. Alternatively, a program stored in the static server 41 may be a module only including an update part of a program. In the following, these programs and a module to be included in a program are referred to as program objects as appropriate.

The dynamic server 40 includes a database. When having received a query from the outside, the dynamic server 40 executes a search of the database and returns, as a result of the search, program information indicating a program stored in the static server 41. The program information at least includes information (acquisition source information) indicating a storage place at which this program is stored in the static server 41, and information indicating the kind of this program. The program information can further include meta information as information on the program information.

In the example illustrated in FIG. 1, the two imaging instruments 201 and 202 are connected with the network 22 and controlled by the client PC 10, but the present invention is not limited to this example. Specifically, the client PC 10 may control one of the two imaging instruments 201 and 202 connected with the network 22, or only one of the two imaging instruments 201 and 202, for example, the imaging instrument 201 may be connected with the network 22. Alternatively, more than two of the imaging instruments 201, 202, . . . may be connected with the network 22, and the client PC 10 may control part or all of the more than two of the imaging instruments 201, 202 . . . .

In the example illustrated in FIG. 1, the one client PC 10 is connected with the network 22, but the present invention is not limited to this example. Specifically, a plurality of clients PC 10 capable of control the imaging instruments 201 and 202 may be connected with the network 22.

In addition, in the example illustrated in FIG. 1, the dynamic server 40 and the static server 41 are individual server devices, but the present invention is not limited to this example. For example, the server system 400 may include one server device, and the dynamic server 40 and the static server 41 may be achieved as individual functions on this server device. Alternatively, the server system 400 may include a plurality of cooperating server devices, and the dynamic server 40 and the static server 41 may be achieved in a distributed manner on the server devices included in the server system 400. The static server 41 does not need to be included in the system when storage places of the driver program and the application program can be uniquely specified.

Figure 2:
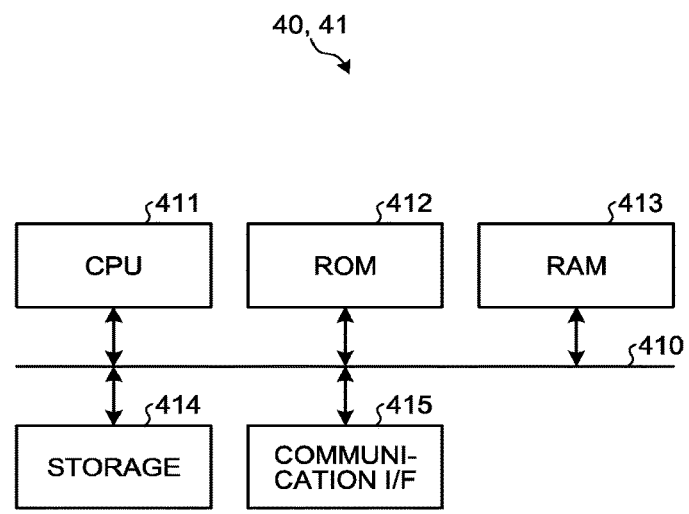
FIG. 2 is a block diagram of an exemplary configuration of a server device applicable to the first embodiment.

FIG. 2 illustrates an exemplary configuration of a server device applicable in common to the dynamic server 40 and the static server 41 when the dynamic server 40 and the static server 41 are achieved by individual server devices. In the following, for the sake of description, the dynamic server 40 and the static server 41 are collectively described as the server device unless otherwise stated.

The server device illustrated in FIG. 2 includes a central processing unit (CPU) 411, a read only memory (ROM) 412, a RAM 413, a storage 414, and a communication I/F 415. These components are connected with each other through a bus 410 to perform communication therebetween.

The storage 414 is a non-transitory semiconductor memory such as a hard disk drive or a flash memory, storing therein a computer program that operates on the CPU 411 and various kinds of data. The storage 414 stores therein the above-described database when the server device is the dynamic server 40, and stores therein the above-described driver program and application program as program objects when the server device is the static server 41.

The CPU 411 controls the entire operation of the server device using the RAM 413 as a work memory in accordance with a computer program read from the ROM 412 or the storage 414. The communication I/F 415 controls communication through the network 30 in accordance with an instruction from the CPU 411.

The configuration of the server device is not limited to the example illustrated in FIG. 2. For example, similarly to a typical computer, the server device may further include a display control unit configured to display, on a display, a screen in accordance with screen information generated by the CPU 411, data I/F configured to perform inputting and outputting of data with an external instrument, and an input device configured to receive a user input.

Figure 3:
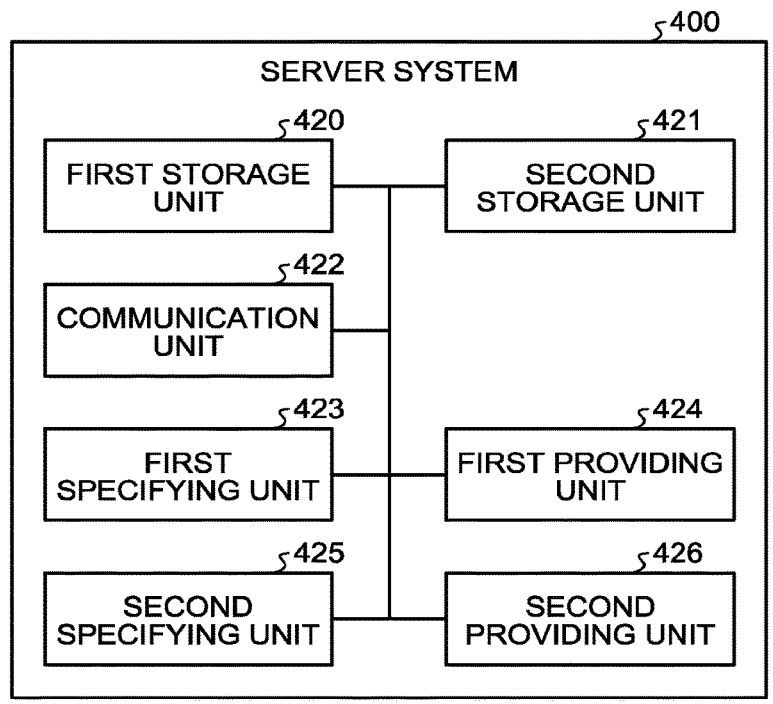
FIG. 3 is an exemplary functional block diagram for description of a function of a server system according to the first embodiment.

FIG. 3 is an exemplary functional block diagram for description of a function of the server system 400 according to the first embodiment. The server system 400 includes a first storage unit 420, a second storage unit 421, a communication unit 422, a first specifying unit 423, a first providing unit 424, a second specifying unit 425, and a second providing unit 426.

Among the first storage unit 420, the second storage unit 421, the communication unit 422, the first specifying unit 423, the first providing unit 424, the second specifying unit 425, and the second providing unit 426, the first specifying unit 423, the first providing unit 424, the second specifying unit 425, and the second providing unit 426 are information stored or generated in the dynamic server 40, and a function of each unit is achieved through execution of a corresponding computer program on the client PC 10, for example. The first storage unit 420 and the second storage unit 421 are achieved by computer programs that operate on the CPUs 411 of the dynamic server 40 and the static server 41, respectively.

Alternatively, the first storage unit 420, the second storage unit 421, the communication unit 422, the first specifying unit 423, the first providing unit 424, the second specifying unit 425, and the second providing unit 426 may be achieved as computer programs operated by the CPUs 411 of the dynamic server 40 and the static server 41.

The first storage unit 420 is a storage unit configured to control, at the static server 41, storing, at predetermined storage places, and reading, from these storage places, of program objects of a plurality of kinds of driver programs and application programs as first computer programs to be mounted on the client PC 10, and program objects of installer programs (second computer programs) for installation of these driver programs and application programs to the client PC 10. The first storage unit 420 stores these program objects in, for example, the storage 414 included in the static server 41.

The second storage unit 421 controls, at the dynamic server 40, storing of information in a database and reading (search) of the information from the database. For example, the second storage unit 421 searches the database in accordance with a query from the outside, and acquires the above-described program information as a result of the search. The second storage unit 421 stores this database in, for example, the storage 414 included in the dynamic server 40.

The communication unit 422 controls communication with the client PC 10 through the network 30.

The first specifying unit 423 is used to specify an installer program to be provided to the client PC 10 based on information on the client PC 10 transmitted from the client PC 10. The first providing unit 424 is used to provide the installer program specified by the first specifying unit 423 to the client PC 10. The second specifying unit 425 is used to specify a program to be provided to the client PC 10 among a plurality of kinds of driver programs and application programs based on information transmitted from the client PC 10 upon execution of the above-described installer program on the client PC 10. The second providing unit 426 is used to provide the program specified by the second specifying unit 425 to the client PC 10.

Figure 4:
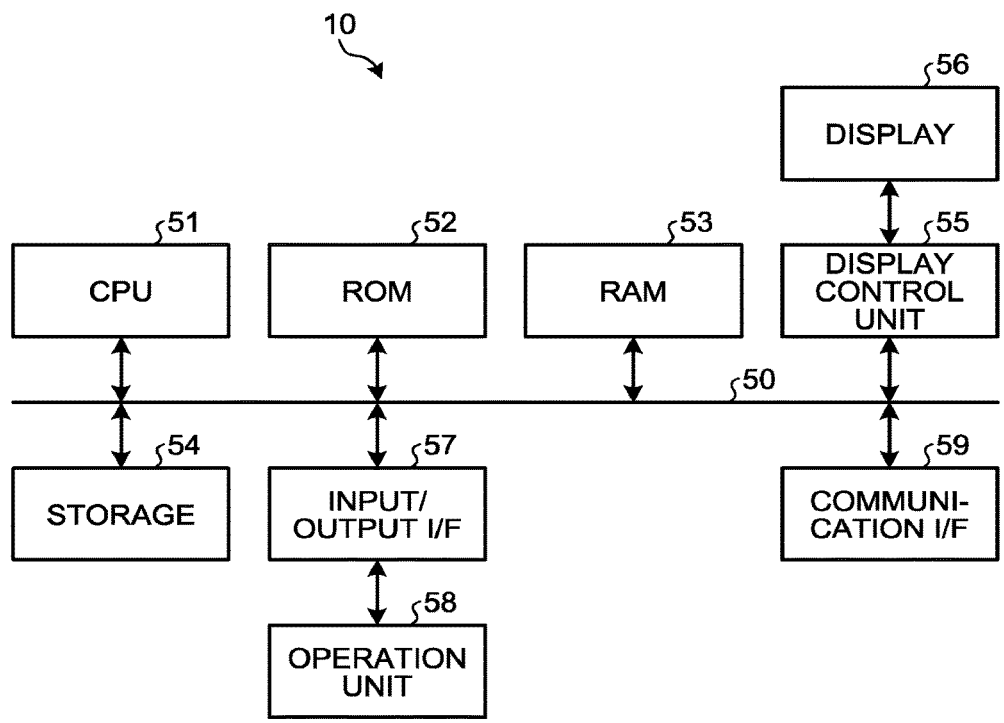
FIG. 4 is a block diagram of an exemplary configuration of a client PC applicable to the first embodiment.

FIG. 4 illustrates an exemplary configuration of the client PC 10 applicable to the first embodiment. In the client PC 10, a central processing unit (CPU) 51, a read only memory (ROM) 52, a random access memory (RAM) 53, a storage 54, a display control unit 55, an input/output I/F 57, and a communication I/F 59 are connected with each other through a bus 50 to perform communication therebetween.

The CPU 51 controls the entire operation of the client PC 10 using the RAM 53 as a work memory in accordance with a program stored in the ROM 52 or the storage 54 in advance. The storage 54 is a hard disk drive or a non-transitory semiconductor memory (flash memory), storing therein a computer program for operating the CPU 51 and various kinds of data.

The display control unit 55 converts a display control signal generated by the CPU 51 in accordance with a computer program into a display signal displayable on a display 56 and supplies the display signal to the display 56. The display 56 includes, for example, a liquid crystal display (LCD) as a display device, and displays, on the display device, a screen in accordance with the display signal supplied from the display control unit 55.

The input/output I/F 57 is an interface configured to perform communication with an external instrument. In the example illustrated in FIG. 4, the input/output I/F 57 is connected with, as the external instrument, an operation unit 58 including a keyboard and a pointing device (mouse, for example). Alternatively, the input/output I/F 57 may be connected with a storage such as a non-transitory semiconductor memory, or a drive device configured to, for example, read data from a disk storage medium such as a compact disc (CD) or a digital versatile disc (DVD). The input/output I/F 57 may be, for example, a Universal Serial Bus (USB).

The communication I/F 59 controls communication through the network 30 using a predetermined protocol such as the Transmission Control Protocol and the Internet Protocol (TCP/IP).

Figure 5:
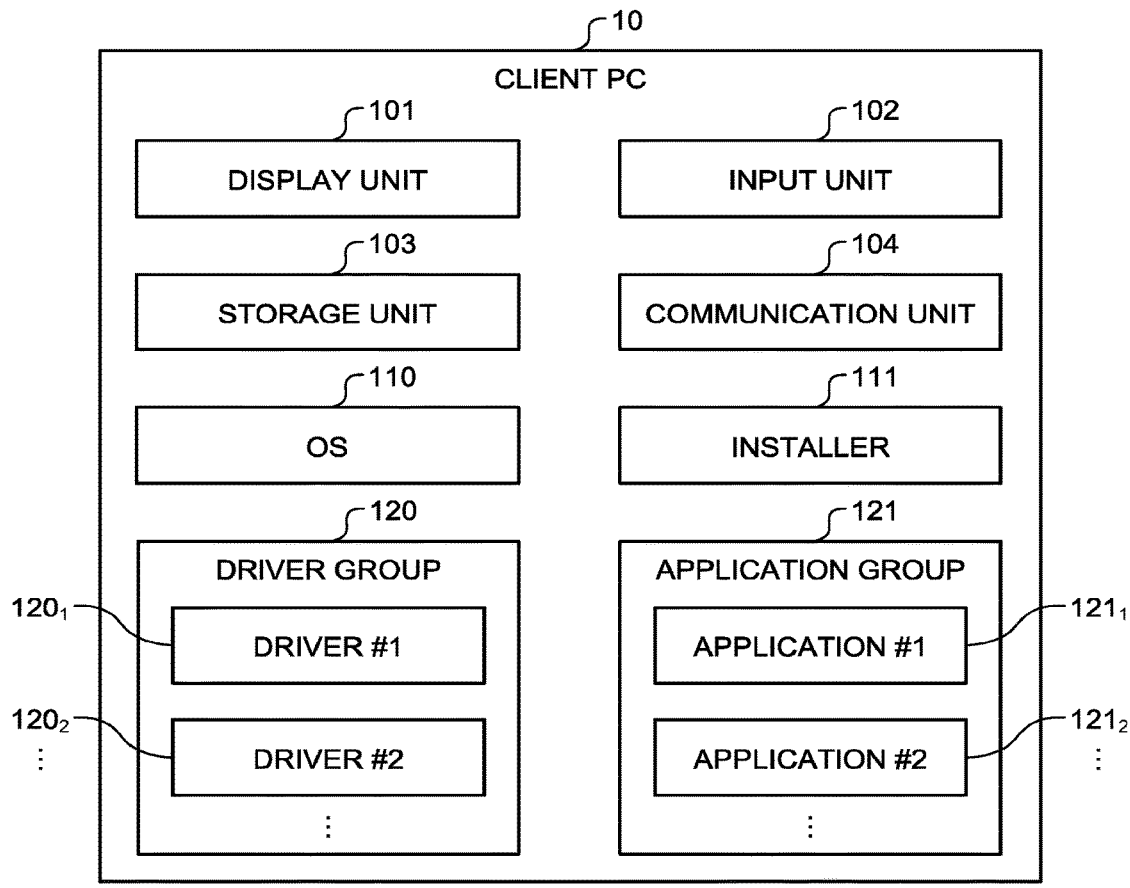
FIG. 5 is an exemplary functional block diagram for description of a function of the client PC according to the first embodiment.

FIG. 5 is an exemplary functional block diagram for description of a function of the client PC 10 according to the first embodiment. In FIG. 5, the client PC 10 includes a display unit 101, an input unit 102, a storage unit 103, a communication unit 104, an OS (Operating System) 110, an installer 111, a driver group 120, and an application group 121.

At the client PC 10, the display unit 101, the input unit 102, the storage unit 103, and the communication unit 104 are achieved by computer programs operating on the CPU 51. Alternatively, some or all of the display unit 101, the input unit 102, the storage unit 103, and the communication unit 104 may be achieved by hardware components that mutually cooperate.

The display unit 101 generates display information for performing display on the display 56 in accordance with an instruction. The display control unit 55 generates, based on the display information generated by the display unit 101, a display signal for performing display on the display 56 in accordance with the display information, and then outputs the display signal to the display 56. The input unit 102 receives a signal in accordance with an user operation output from the operation unit 58. The storage unit 103 stores data in the storage 54 and the RAM 53. The communication unit 104 controls communication through the communication I/F 59.

The driver group 120 can include one or more driver programs 1201, 1202, . . . The application group 121 can include one or more application programs 1211, 1212, . . . In FIG. 5, the driver programs 1201, 1202, . . . are indicated as driver #1, driver #2 . . . , Similarly, the application programs 1211, 1212, . . . are indicated as application #1, application #2.

The driver programs 1201, 1202, . . . each allow the CPU 51 to execute a function of performing intermediation between the OS 110 and an external instrument connected with the client PC 10 when the OS 110 controls the external instrument. The driver programs 1201, 1202, . . . each provide an appropriate user interface (UI) to a user when the external instrument is used through the client PC 10. The driver programs 1201, 1202, . . . are each prepared for, for example, each model and each function of the external instrument, and installed on the client PC 10.

The application programs 1211, 1212, . . . are each, for example, a utility program that allows more convenient use of the external instrument. For example, when the external instrument is a projector configured to project an image onto a projection medium, the application programs 1211, 1212, . . . may be each a projection application that allows projection of a display screen of the client PC 10 by a projector and setting of the projector through the client PC 10. When the external instrument is an electronic blackboard configured to display written information as image data, the application programs 1211, 1212, . . . may be each an electronic blackboard viewer application for performing viewing of, at the client PC 10, an image or the like generated through a user operation (writing, for example) on the electronic blackboard, and several settings of the electronic blackboard through the client PC 10. Alternatively, the application programs 1211, 1212, . . . may be each an image forming device operation application program for achieving an operation screen of an image forming device such as an MFP or a printer device at the client PC 10, and performing setting and operation of the image forming device through the client PC 10. Alternatively, the application programs 1211, 1212, . . . may be each a communication setting tool for performing setting of wireless communication when the imaging instruments 201, 202, . . . perform communication with the client PC 10 or the network 30 through wireless communication such as WiFi (registered trademark). Alternatively, the application programs 1211, 1212, . . . may be each an application program typically used at the client PC 10.

The installer 111 installs, on the client PC 10, the driver programs 1201, 1202, . . . included in the driver group 120, and the application programs 1211, 1212, . . . included in the application group 121. The installer 111 installs computer programs for updating the driver programs 1201, 1202, . . . , and the application programs 1211, 1212 . . . .

Figure 6:
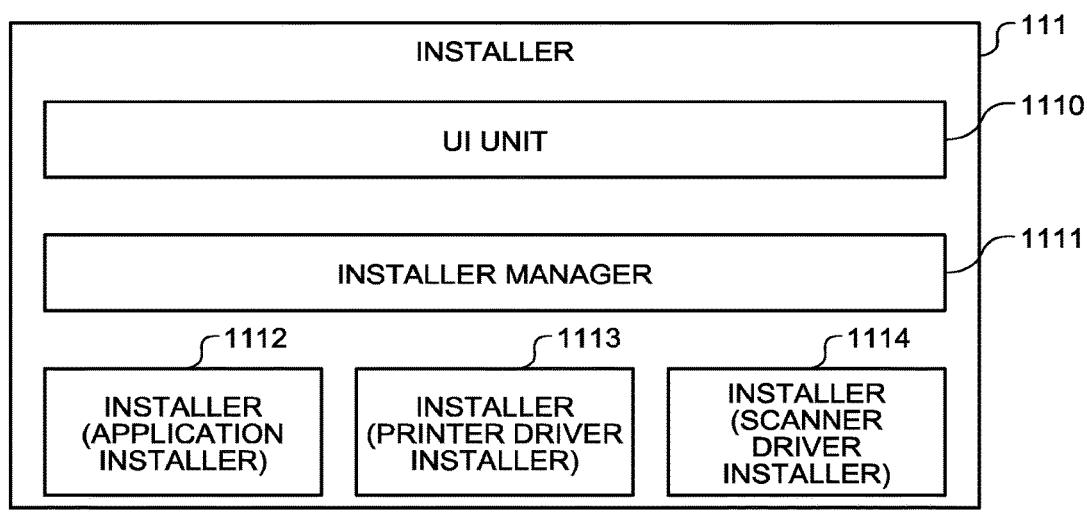
FIG. 6 is an exemplary functional block diagram for description of a function of an installer according to the first embodiment.

FIG. 6 is an exemplary functional block diagram for description of a function of the installer 111 according to the first embodiment. The installer 111 is a computer program including an UI unit 1110, an installer manager 1111, and installers 1112, 1113, and 1114 each corresponding to the kind of computer program to be installed.

In the example illustrated in FIG. 6, among the installers 1112, 1113, and 1114, the installer 1112 is an application installer configured to install an application program. The installer 1113 is a printer driver installer configured to install a printer driver program for controlling a printer function. The installer 1114 is a scanner driver installer configured to install a scanner driver program for controlling a scanner function. An installer corresponding to the kind of computer program is prepared because installation takes different procedures depending on the kind of computer program.

The following schematically describes installation processing by the installers 1112, 1113, and 1114.

The installer 1112 configured to execute processing of installing an application program will be described. Assuming a task in a relatively small range, the application program is a computer program produced to meet a particular request by a user, and typically does not perform direct control of an external device such as a printer or a scanner through the client PC 10.

The processing of installing an application program, which is executed by the installer 1112, includes processing of storing each file included in the application program into a predetermined folder produced on the client PC 10, and initial setting of the registry and registration to the start menu when the OS is Windows (registered trademark). A configuration file of the application program can be stored in a folder (the "Program Files" folder when the OS is Windows (registered trademark)) prepared by the OS. Alternatively, the configuration file may be stored in an optional folder produced at the client PC 10.

The following describes the installer 1113 configured to execute processing of installing a printer driver program. The processing of installing a printer driver, executed by the installer 1113 includes processing of storing each file included in the printer driver into a folder on the client PC 10 determined by the OS, setting of a printing port, production of a logical printer queue, and initial setting of the registry when the OS is Windows (registered trademark). Processing of producing the logical printer queue includes, for example, processing of producing an icon representing a printer corresponding to a printer driver to be installed.

The following describes the installer 1114 configured to execute processing of installing a scanner driver program. The processing of installing a scanner driver, executed by the installer 1114 includes processing of storing each file included in the scanner driver into a folder on the client PC 10 determined by the OS, and processing of setting a scan port.

Figure 7:
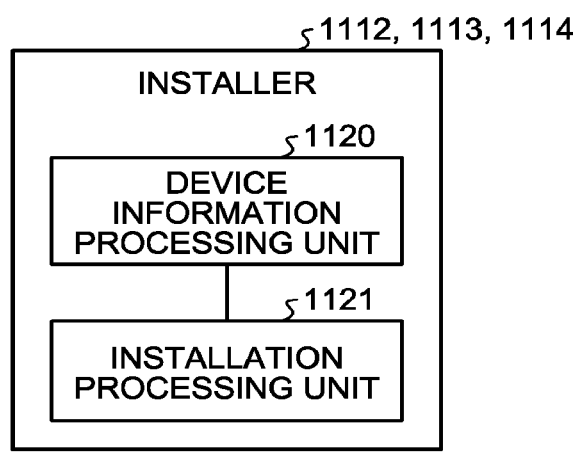
FIG. 7 is an exemplary functional block diagram for description of a function of an installer configured to perform installation processing in accordance with the kind of a computer program to be installed according to the first embodiment.

FIG. 7 is an exemplary functional block diagram for description of functions of the installers 1112, 1113, and 1114. In the following description, the installer 1112 represents the installers 1112, 1113, and 1114. The installer 1112 includes a device information processing unit 1120 and an installation processing unit 1121.

The device information processing unit 1120 is a first processing unit configured to acquire device information from each device (the imaging instruments 201 and 202 in the example illustrated in FIG. 1) connected with the client PC 10 through the network 22 and transmit the acquired device information to the server system 400. The installation processing unit 1121 is a second processing unit configured to execute processing of installing a driver program or an application program received from the server system 400 on the client PC 10.

In FIG. 6, at operation of the installer 111, the UI unit 1110 provides display and a UI such as an input interface to a user.

The installer manager 1111 performs control and management of installation of a driver program or an application program on the client PC 10. Although described later in detail, the installer manager 1111 transmits a query including information on the client PC 10 to the dynamic server 40 through the communication unit 104. Then, the installer manager 1111 acquires program information returned from the dynamic server 40 in response to this query and indicating a computer program to be installed, and acquires the computer program (program object) from the static server 41 in accordance with the acquired program information. The installer manager 1111 selects an installer used to install the computer program from among the installers 1112, 1113, and 1114 based on the acquired program information, and causes the selected installer to execute installation of the computer program. In other words, the installer manager 1111 has functions of a program information acquisition unit configured to acquire program information, a computer program acquisition unit configured to acquire a computer program, and an installation control unit configured to control installation processing.

The UI unit 1110, the installer manager 1111, and the installers 1112, 1113, and 1114 included in the installer 111 described above are achieved by a computer program operating on the CPU 51. The installer 111 may initially include the UI unit 1110 and the installer manager 1111 only, and additionally include the installers 1112, 1113, and 1114 later. This computer program is stored on a computer connected with a network with which the communication I/F 59 can communicate, downloaded through the network and provided. Alternatively, this computer program may be provided or distributed through the network.

Alternatively, this computer program may be recorded and provided as a file in an installable or executable format in a computer-readable recording medium such as a compact disc (CD) or a digital versatile disc (DVD). In this case, the computer program is supplied to the client PC 10 through an external drive device or computer connected with the input/output I/F 57.

Alternatively, the computer program may be stored in the ROM 52 or the storage 54 in advance and provided.

The computer program is configured as, for example, a module including the above-described components (the UI unit 1110, the installer manager 1111, and the installers 1112, 1113, and 1114). Each component is loaded onto and generated on a main storage device (the RAM 53, for example) by the CPU 51 as actual hardware reading the computer program from, for example, the storage 54 and executing the computer program.

FIG. 8 illustrates an exemplary configuration of records in a database stored in the dynamic server 40 according to the first embodiment. One record in the database corresponds to one computer program, and at least includes program information as a computer program to be installed by the installer 111, and system information as information on an information processing device on which the computer program is installable.

In FIG. 8, among items of a record, "ID", "display name", "version", "update date and time", "size", "installer identification name", "metadata", and "resource location" are included in the program information on a computer program corresponding to the record.

The item "ID" is identification information for identifying the computer program corresponding to the program information, and indicates, for example, the kind of the computer program. The item "display name" is a name used when the computer program indicated by the program information is displayed on, for example, the display unit 101. The items "version" and "update date and time" are version information and update date and time information, respectively, on the computer program corresponding to the program information. The item "size" indicates the data size of the computer program corresponding to the program information.

The item "installer identification name" is an identification name for identifying an installer that executes installation of the computer program corresponding to the program information. The item "metadata" is information (a uniform resource locator (URL), for example) indicating an acquisition source from which information (meta information) on the program information is to be acquired. The item "resource location" indicates information (a URL, for example) indicating an acquisition source from which the computer program corresponding to the program information (program object) is to be acquired. The item "resource location" is, for example, a URL included in the static server 41. Similarly, the item "metadata" is a URL included in the static server 41.

In FIG. 8, "OS version", "architecture", "locale", and "model specification information" among the items of a record indicate system information of a system with which the computer program of the record is compatible. The item "OS version", and "architecture" indicate the version and architecture, respectively, of an OS on which the computer program is installable. The item "locale" is locale information such as a language used when the computer program is installed.

The item "model specification information" is information for specifying the model of an external instrument corresponding to the record. The item "model specification information" may be a plug-and-play ID (PnP ID) as identification information for identifying a vendor and a model, which is used in a plug-and-play technology.

Figure 9:
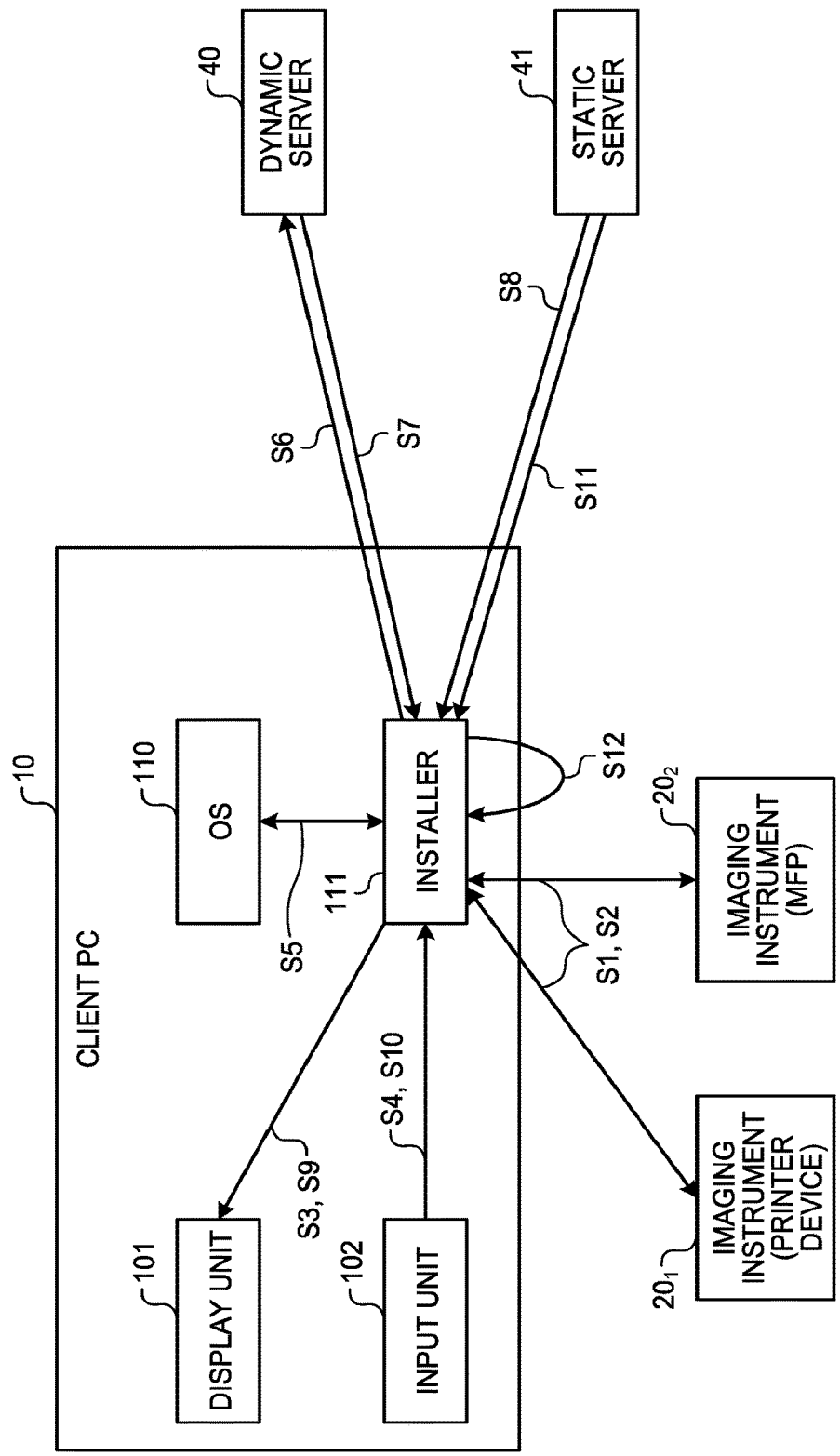
FIG. 9 is a diagram for schematic description of an installation procedure according to the first embodiment.

The following schematically describes a procedure of installing a driver program or an application program according to the first embodiment with reference to FIG. 9. In FIG. 9, the same part as in FIGS. 1, 5, and 6 described above is denoted by an identical reference sign, and detailed description thereof will be omitted. The installation procedure illustrated in FIG. 9 is started in response to, for example, a user operation on the client PC 10.

When the installation procedure is started, the installer 111 first searches for any external instrument (the imaging instruments 201, 202, . . . ) connected with the network 22 in a segment with which the client PC 10 is connected (step S1), and acquires, from the searched external instrument, model specification information for specifying the model of this external instrument (step S2). The installer 111 may search for the external instrument using, for example, Bonjour (registered trademark) or Simple Network Management Protocol (SNMP).

Alternatively, the installer 111 acquires, for example, a PnP ID as the model specification information. The installer 111 acquires the PnP ID from an external instrument using a network identifier such as the Internet Protocol (IP) address of the external instrument, which is acquired at the search of the external instrument, and a protocol such as SNMP or Web Services for Devices (WSD).

In the example illustrated in FIG. 9, the installer 111 searches, as external instruments from the network 22, for the imaging instrument 201, which is a printer device, and the imaging instrument 202, which is an MFP, and acquires the model specification information thereof.

The installer 111 causes the display unit 101 to display a list (device list) of the model specification information acquired at steps S1 and S2, and presents the list to the user (step S3). In reality, the display unit 101 presents, to the user, a display name corresponding to the model specification information. The user operates the input unit 102 in response to the model specification information list displayed by the display unit 101, and selects an external instrument from which a driver or an application is to be acquired. The input unit 102 returns the model specification information of the selected external instrument to the installer 111 (step S4).

The installer 111 acquires, from the OS 110, information used when a program is installed (step S5). For example, the installer 111 acquires, from the OS 110, OS identification information, such as version information of the OS, for identifying the OS. At step S5, the installer 111 also acquires information such as locale information from the OS 110.

The installer 111 combines the model specification information of the selected external instrument which is acquired at step S4, with at least the OS identification information acquired at step S5 to generate a query requesting a search for a computer program installable on the client PC 10, and transmits the query to the dynamic server 40 at step S6 (a transmission unit, the first processing unit). The dynamic server 40 executes search processing on the database in accordance with the query transmitted from the installer 111, and outputs the program information corresponding to the query (a first specification unit, a second specification unit). When a plurality of pieces of program information corresponding to the query are found, the dynamic server 40 outputs the pieces of program information. At step S7, the dynamic server 40 transmits a list of the searched program information to the installer 111 from which the query is transmitted (a first provision unit, a second provision unit).

When the program information transmitted from the dynamic server 40 includes information indicating a source from which meta information is acquired, the installer 111 acquires the meta information from the acquisition source (step S8). In this example, the meta information is stored in the static server 41.

The installer 111 produces a list of computer programs installable on the client PC 10 based on the program information acquired from the dynamic server 40 at step S7, and information on any computer program already installed on the client PC 10 by the installer 111. The installer 111 may produce, based on the program information acquired from the dynamic server 40 and the information on any computer program already installed on the client PC 10 by the installer 111, a list of computer programs that can each update the already installed computer program, and add this list to the list of any installable computer program.

The installer 111 causes the display unit 101 to display the produced installable computer program list, and presents the list to the user (step S9). The user operates the input unit 102 in response to the list of computer programs displayed by the display unit 101, and selects a computer program to be installed or updated. The input unit 102 passes information indicating the selected computer program to the installer 111 (step S10).

The installer 111 acquires the selected computer program from the static server 41 in accordance with information indicating the acquisition source of the computer program and included in the program information corresponding to the information indicating the computer program, which is passed at step S10 (step S11). Then, at step S12, the installer 111 installs the computer program acquired from the static server 41 on the client PC 10 (the second processing unit). Specifically, the installer 111 determines the kind of computer program to be installed based on the program information, selects an installer matching with the determined kind of the computer program among the installers 1112, 1113, and 1114, and causes the selected installer to execute installation of the computer program.

In this manner, according to the first embodiment, the installer 111 acquires program information indicating an installable computer program from the dynamic server 40 based on the model specification information of an external instrument and the OS identification information for identifying the OS thereof. Then, an installer used to install this computer program is selected in accordance with information included in the program information and indicating the kind of the computer program. With this configuration, a plurality of computer programs in different kinds can be installed through a common operation of one installer 111.

Figure 10:
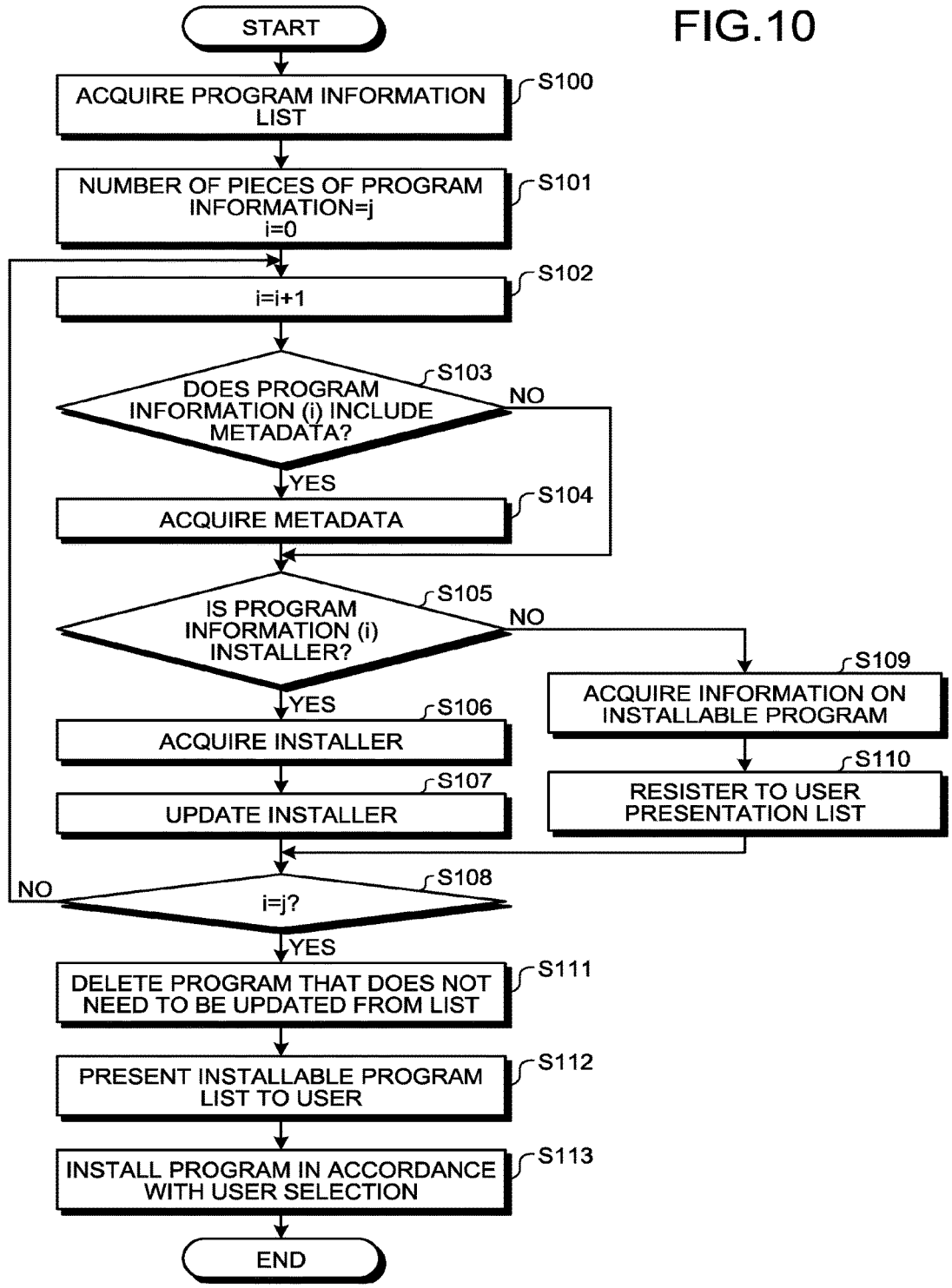
FIG. 10 is an exemplary flowchart of installation processing according to the first embodiment.

The following describes the installation processing according to the first embodiment in more detail. FIG. 10 is an exemplary flowchart of the installation processing according to the first embodiment. Each processing in the flowchart illustrated in FIG. 10 is executed by the installer 111. At step S100, the installer 111 executes a search for any external instrument through the network 22 and a query to the dynamic server 40, and acquires a program information list indicating any computer program installable on the client PC 10.

The installer 111 initializes a variable i to be the value "0" (step S101). A value j represents the total number of pieces of program information acquired at step S100.

In the following, the processing at steps S102 to S108 is executed for all pieces of program information acquired at step S100. In the following, program information (i) represents the i-th program information.

The installer 111 increments the variable i by one at step S102, and determines whether the program information (i) includes metadata (meta information) at step S103. If it is determined that the program information (i) includes no metadata, the installer 111 proceeds the process to step S105. If it is determined that the program information (i) includes metadata, the installer 111 proceeds the process to step S104 and acquires the metadata from the static server 41 based on description of the program information (i). Having acquired the metadata, the installer 111 proceeds the process to step S105.

At step S105, the installer 111 determines whether a computer program indicated by the program information (i) is an installer configured to execute installation of a computer program such as a driver program or an application program. Specifically, the installer 111 determines whether the computer program indicated by the program information (i) is any one of the installers 1112, 1113, and 1114 included in the installer 111. If it is determined that the computer program indicated by the program information (i) is an installer, the installer 111 proceeds the process to step S106.

At step S106, the installer 111 acquires, from the static server 41, an installer indicated by the program information (i) among the installers 1112, 1113, and 1114 in accordance with the acquisition source information indicated by the program information (i). Then, at the subsequent step S107, the installer 111 installs the installer acquired at step S106 on the client PC 10, and updates the installer.

At step S105, if it is determined that the computer program indicated by the program information (i) is not an installer, the installer 111 proceeds the process to step S109. At step S109, the installer 111 passes the program information (i) to an installer indicated by the program information (i), and requests the installer to acquire information on any installable computer program.

If the metadata is acquired at step S104, the installer 111 passes the acquired metadata together with the program information (i) to the installer. If the program information (i) includes no metadata and thus no metadata is acquired, the installer acquires, a display name included in the program information (i), as the information on any installable computer program. If metadata is acquired at step S104, the installer acquires the information on any installable computer program in accordance with the metadata. At the subsequent step S110, the installer 111 registers the information on any computer program, which is acquired at step S109, to the installable computer program list, which is to be presented to the user.

After the processing at step S107 or S110, the installer 111 proceeds the process to step S108. At step S108, the installer 111 determines whether the variable i matches with the value j as the total number pieces of program information. If the variable i matches with the value j, it can be determined that processing has ended for all pieces of program information acquired at step S100. If it is determined that the variable i does not match with the value j, the installer 111 returns the process to step S102 and increments the variable i by one to execute processing on the next program information (i).

If it is determined that the variable i matches with the value j, the installer 111 proceeds the process to step S111. At step S111, the installer 111 deletes a computer program that does not need to be updated from the installable computer program list to which the information on any computer program is registered at step S110 described above and that is to be presented to the user.

For example, the installer 111 acquires version information of the first computer program registered to the list, and compares the version information of the first computer program with version information of the second computer program corresponding to the first computer program and already installed on the client PC 10. Then, if the version information of the first computer program does not indicate a version newer than of the version information of the second computer program, the installer 111 determines that the first computer program is a computer program that does not need to be updated, and deletes the first computer program from the list.

At the subsequent step S112, the installer 111 causes, for example, the display unit 101 to display the installable computer program list to be presented to the user, and presents the list to the user. At step S113, the installer 111 installs, on the client PC 10, a computer program selected by the user in response to the display of the installable computer program list on the display unit 101, and ends the series of processing according to the flowchart illustrated in FIG. 10.

Figure 11:
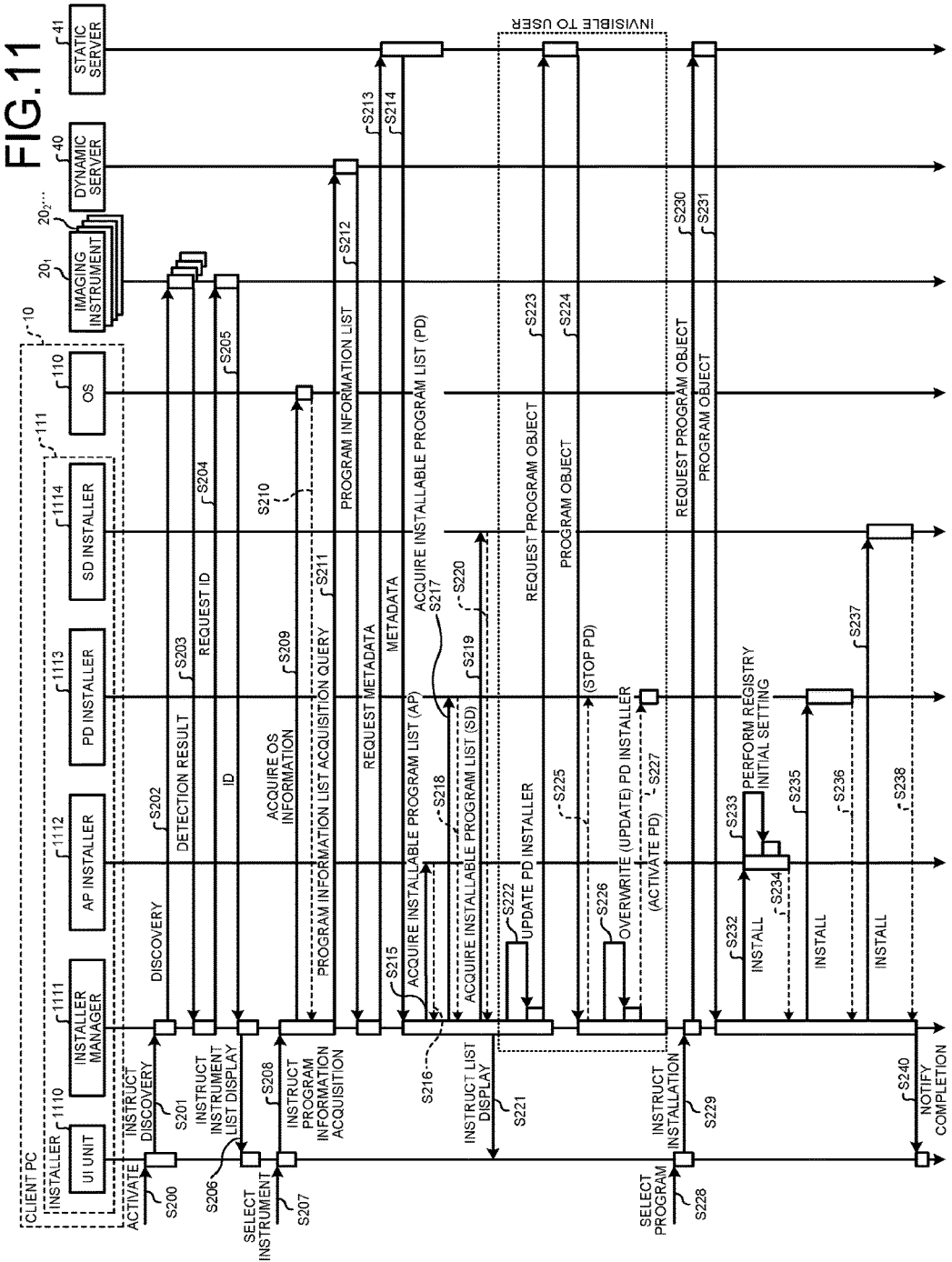
FIG. 11 is a sequence diagram illustrating exemplary processing at the entire information processing system in the installation processing according to the first embodiment.

FIG. 11 is a sequence diagram illustrating exemplary processing at the entire information processing system in the installation processing according to the first embodiment. In FIG. 11, the same part as in FIGS. 1, 5, and 6 described above is denoted by an identical reference sign, and detailed description thereof will be omitted. In the following description, the installer 1112 configured to perform installation of an application program is referred to as the AP installer 1112, the installer 1113 configured to perform installation of a printer driver program is referred to as the PD installer 1113, and the installer 1114 configured to perform installation of a scanner driver program is referred to as the SD installer 1114.

For example, a user operation on the client PC 10 instructs activation of the installer 111. The UI unit 1110 of the installer 111 is notified of this activation instruction (step S200). The UI unit 1110 instructs, to the installer manager 1111, discovery of external instrument connected with the network 22 in the same segment as the client PC 10 (step S201). The installer manager 1111 performs, in response to this instruction, operation of external instrument search on the network 22 using, for example, Bonjour (registered trademark) or SNMP (step S202).

Having received a result detection of the external instrument search (step S203), the installer manager 1111 requests model specification information from detected external instruments (the imaging instruments 201, 202, . . . ) (step S204). The installer manager 1111 receives the model specification information transmitted from each external instrument in response to this request (step S205). The installer manager 1111 instructs, based on the received model specification information of each external instrument, the UI unit 1110 to display an instrument list for selecting an external instrument (step S206). The UI unit 1110 produces an instrument list display screen in response to this instruction, and passes the instrument list display screen to the display unit 101.

The display unit 101 displays the instrument list display screen passed from the UI unit 1110 on the display 56. More specifically, the display unit 101 generates a display control signal for displaying the instrument list display screen, and passes the display control signal to the display control unit 55. The display control unit 55 generates a display signal based on the passed display control signal and outputs the display signal to the display 56. In this manner, the instrument list display screen is displayed on the display 56.

FIG. 12 illustrates an exemplary instrument list display screen according to the first embodiment. In FIG. 12, a display area 201 and a button 204 are arranged on this instrument list display screen 200. The display area 201 includes a list display 202 indicating a list of the model specification information acquired at step S205, and a selection input part 203 for selecting a model corresponding to an instrument displayed on the list display 202. In this example, check boxes are provided in the selection input part 203 to allow a plurality of items to be selected. When operated, the button 204 fixes selection input on the selection input part 203.

When a model is selected through a user operation in response to the instrument list display screen 200 (step S207), the UI unit 1110 instructs the installer manager 1111 to acquire program information corresponding to the selected model (step S208). In accordance with the instruction, the installer manager 1111 requests the OS 110 to acquire OS information (step S209). The OS 110 returns the OS information in response to the request (step S210). The OS information includes information indicating the version, architecture, and locale of the OS. The OS information may further include information indicating an OS name.

Subsequently, the installer manager 1111 produces a query acquiring a list of program information based on the model specification information acquired at steps S204 and S205 and the OS information acquired at steps S209 and S210, and transmits the query to the dynamic server 40 (step S211). The dynamic server 40 searches the database in accordance with this query and returns the list of program information obtained through the search to the installer manager 1111 (step S212).

FIG. 13 illustrates an exemplary query applicable to the first embodiment, produced by the installer manager 1111, and transmitted to the dynamic server 40 at step S211. In FIG. 13 and any following diagram illustrating similar exemplary data, unless otherwise stated, a number at the start of each line is a line number used for description and separated by the following colon (:) from a code as a data body. A code exemplarily illustrated in each embodiment is a pseudo code simulating notation of C language typically used as a programming language.

FIG. 13 illustrates that, in a description between outermost brackets "{" and "}" of a query, information on an external instrument is described as the item "peripheral" between the first line (line number "2") below the bracket "{" and the third line (line number "4"). In the example illustrated in FIG. 13, in the item "peripheral", model specification information "MFP Model A" as a PnP ID is written between brackets "{" and "}".

In the query, OS information is written as the item "system" between the fourth line to the eighth line (line numbers "5" to "9"). In the example illustrated in FIG. 13, between brackets "{" and "}" of the item "system", an OS version is written as the value "6.1.7601.65536" of the item "version" on the first line (line number "6") below the bracket "{", OS architecture is written as the value "×64" of the item "architecture" on the second line (line number "7"), and locale information is written as the value "ja-JP" of the item "locale" on the third line (line number "8").

The dynamic server 40 searches the database described with reference to FIG. 8 in accordance with this query, and extracts a record matching with each piece of information described in the query. In the exemplary database illustrated in FIG. 8, the dynamic server 40 extracts a record, information described in each of the items "OS version", "architecture", "locale", and "model specification information" of which matches with the corresponding information described in the query. Then, the dynamic server 40 transmits, as program information to the installer manager 1111, information of the items "ID", "display name", "version", "update date and time", "size", "installer identification name", "metadata", and "resource location" in the extracted record. When having extracted a plurality of records in accordance with a query, the dynamic server 40 transmits information of items of each of the extracted records to the installer manager 1111 as a list of program information for the record.

FIG. 14 illustrates an exemplary program information list transmitted from the dynamic server 40 according to the first embodiment. As exemplarily illustrated in FIG. 14, the program information list writes one piece of program information in each pair of brackets "{" and "}" inside the outermost brackets "[" and "]" on lines with line numbers "1" and "68". In the example illustrated in FIG. 14, the program information list writes the program information (1) between brackets "{" and "}" on lines with line numbers "2" to "11", and similarly, writes the program information (2) to (7) on lines with line numbers "12" to "21", lines with line numbers "22" to "30", lines with line numbers "31" to "39", lines with line numbers "40" to "48", lines with line numbers "49" to "58", and lines with line numbers "59" to "67", respectively.

Each program information (i) writes, between brackets "{" and "}", the items "id", "name", "version", "date" ("published_date"), "size", "installer", "metadata_url", and "download_url" corresponding to the items "ID", "display name", "version", "update date and time", "size", "installer identification name", "metadata", and "resource location" of a record of the dynamic server 40, respectively.

In the example illustrated in FIG. 14, in the program information (1), the item "id" on the first line (line number "3") inside brackets has the value "mfp_modela_printer_pcl", indicating the kind of computer program. The item "name" on the second line (line number "4") has the value "MFP Model A Printer Driver PCL". The item "version" on the third line (line number "5") inside the brackets has the value "1.2.0.0", and the item "date" on the fourth line (line number "6") has the value "2014 Jan. 11". The item "size" on the fifth line (line number "7") has the value "12000".

In the program information (1), the item "installer" on the sixth line (line number "8") inside the brackets has the value "printer_driver_installer", indicating that the PD installer 1113 is the installer corresponding to a computer program described in the program information (1). The item "metadata_url" on the seventh line (line number "9") inside the brackets has the value "https://example.com/mfp_model-a_printer_pcl/metadata.json", indicating the URL of an acquisition source of metadata. The item "download_url" on the eighth line (line number "10") has the value "https://example.com/mfp_modela_printer_pcl/object.zip", indicating the URL of an acquisition source of a program object included in a computer program to be installed.

In FIG. 14, in the program information (2) on lines with line numbers "12" to "21", the item "id" has the value "mfp_modela_printer_ps", the item "name" has the value "MFP Model A Printer Driver Postscript", the item "version" has the value "1.0.0.0", the item "date" has the value "2014 Jan. 1", and the item "size" has the value "6000". The item "installer" has the value "printer_driver_installer", indicating that the PD installer 1113 is the installer corresponding to a computer program described in the program information (2). In the program information (2), the item "metadata_url" and the item "download_url" have the URLs of acquisition sources of metadata and a program object, respectively.

In the program information (3) on lines with line numbers "22" to "30", the item "id" has the value "mfp_modela_s-canner", the item "name" has the value "MFP Model A Scanner Driver", the item "version" has the value "1.0.0.0", the item "date" has the value "2014 Jan. 1", and the item "size" has the value "5000". The item "installer" has the value "scanner_driver_installer", indicating that the SD installer 1114 is the installer corresponding to a computer program described in the program information (3). In the program information (3), the item "download_url" has the URL of an acquisition source of a program object. In this example, the item "metadata_url" having the URL of an acquisition source of metadata is omitted in the program information (3).

Similarly, information in the program information (4) to (7) is written for each item. The value of the item "installer" indicates which of the AP installer 1112, the PD installer 1113, the SD installer 1114, and the installer manager 1111 is the installer corresponding to a computer program described in each of the program information (4) to (7), respectively. In the example illustrated in FIG. 14, the value of the item "installer" indicates that the PD installer 1113 corresponds to computer programs described in the program information (1), (2), (4), and (5). It is also indicated that the SD installer 1114 corresponds to a computer program described in the program information (3), and the AP installer 1112 corresponds to a computer program described in the program information (6).

In FIG. 14, in the program information (7), the item "installer" has the value "installer_manager", indicating that a computer program indicated by the item "id" is installed or updated on the installer manager 1111.

In each program information (i), the item "metadata_url" may be omitted. In the example illustrated in FIG. 14, the program information (3), (4), (5), and (7) include no metadata, and the item "metadata_url" is omitted accordingly. In the program information (7) in which the item "installer" has the value "installer_manager", the value of the item "id" is preferably a value corresponding to the value of the item "installer" in the program information of another computer program to be installed by a program installer indicated by the program information (7).

When having received a list of program information from the dynamic server 40, the installer manager 1111 executes, on pieces of program information (i), the total number of which is j, processing at steps S213 to S220 below in accordance with the processing at steps S102 to S110 in the flowchart illustrated in FIG. 10.

Specifically, the installer manager 1111 determines whether the i-th program information (i) includes metadata in accordance with step S103 illustrated in FIG. 10. If the item "metadata_url" is written in the program information (i), it is determined that the program information (i) includes metadata. If it is determined that the program information (i) includes metadata, the installer manager 1111 requests the metadata from, for example, the static server 41 in accordance with the URL of an acquisition source of the metadata written in the item "metadata_url" of the program information (i) (step S213). The static server 41 transmits the metadata to the installer manager 1111 in response to this request (step S214).

In the example illustrated in FIG. 14, the item "metadata_url" is written in the program information (1), indicating that metadata is included. The installer manager 1111 requests, from the static server 41, metadata at a URL indicated by the value "https://example.com/mfp_modela_printer_pcl/metadata.json" of the item "metadata_url" inside the program information (1).

The following describes metadata. FIGS. 15 and 16 illustrate exemplary configurations of metadata according to the first embodiment. Metadata has its format defined by the kind of a corresponding installer. FIG. 15 illustrates exemplary metadata describing identification information of a sub instrument. The metadata exemplarily illustrated in FIG. 15 is applicable to installers, such as the PD installer 1113 and the SD installer 1114, of drivers for controlling external instruments.

The following describes a sub model. The sub model is one of a plurality of models of an external instrument having one piece of model specification information, the models having slightly different specifications. For example, for a printer device or an MFP, a plurality of models having specification difference therebetween such as a small partially different configuration in, for example, a finisher have one piece of model specification information (PnP ID, for example) in some cases. The models having one piece of model specification information are supported by one driver program in some cases. In addition, the configuration of a UI needs to be changed in accordance with a model selected from among the models in some cases at installation of a driver program.

In the example illustrated in FIG. 15, in metadata indicated by one piece of model specification information, the item "model_names" written on a line with line number "2" indicates that identification information (hereinafter referred to as sub model identification information) for identifying a sub model is written between a bracket "[" and the corresponding bracket "]" on this line. A plurality of pieces of sub model identification information can be written between the brackets "[" and "]". The PD installer 1113 and the SD installer 1114 are each one program object, but can identify a plurality of sub models through one piece of model specification information by referring to metadata including the sub model identification information in accordance with description of the program information corresponding to this program object.

FIG. 16 illustrates exemplary metadata describing information on installation of an application program. The metadata exemplarily illustrated in FIG. 16 is applicable to the AP installer 1112 configured to install an application program. When an application program is installed, predetermined information is stored in an area managed by the OS 110. The metadata exemplarily illustrated in FIG. 16 describes information to be stored in the managed area of the OS 110. For example, when an application program indicated by program information including the metadata is installed on the client PC 10, the AP installer 1112 writes initial settings to the management information of the OS 110 based on each piece of information written in the metadata.

For example, when the OS 110 is Windows (registered trademark) provided by Microsoft Corporation (U.S.A), the registry can be used as the managed area of the OS 110.

As illustrated in FIG. 11, the installer manager 1111 requests an installable computer program list from the AP installer 1112, the PD installer 1113, and the SD installer 1114 in accordance with the program information (i) (steps S215 to S220).

For example, if the item "installer" of the program information (i) has the value "application installer", the installer manager 1111 determines that the AP installer 1112 is the installer corresponding to this program information (i). Then, the installer manager 1111 passes, to the AP installer 1112, information of the items "id", "name", "version", "date", "size", "installer", and "download_url" of the program information, and requests an installable computer program list from the AP installer 1112 (step S215). If the program information (i) includes the item "metadata_url", the installer manager 1111 also passes the metadata acquired at steps S213 and S214 to the AP installer 1112.

The AP installer 1112 returns an installable computer program list to the installer manager 1111 based on the passed information (step S216). In this example, whether or not the metadata is passed to the AP installer 1112, the AP installer 1112 returns information written in the item "name" of the program information to the installer manager 1111 as information on installable computer programs.

More specifically, in the example illustrated in FIG. 14, the item "installer" of the program information (6) written on lines with line numbers "49" to "58" has the value "application_installer", indicating that the AP installer 1112 is the installer corresponding to the program information. The installer manager 1111 passes the value of each item of the program information to the AP installer 1112 based on the value of the item "installer". The AP installer 1112 returns the value "MFP Management Utility" of the item "name" of the program information to the installer manager 1111 as information on installable computer programs.

For example, if the item "installer" of the program information (i) has the value "printer_driver_installer", the installer manager 1111 determines that the PD installer 1113 is the installer corresponding to the program information (i). Then, the installer manager 1111 passes, to the PD installer 1113, information of the items "id", "name", "version", "date", "size", "installer", and "download_url" of the program information, and requests an installable computer program list from the PD installer 1113 (step S217). If the program information (i) includes the item "metadata_url", the installer manager 1111 also passes the metadata acquired at steps S213 and S214 and corresponding to the program information (i) to the PD installer 1113.

The PD installer 1113 returns the installable computer program list to the installer manager 1111 based on the passed information (step S218). If the metadata is passed to the PD installer 1113, the PD installer 1113 acquires sub model identification information written in the metadata, and returns the acquired sub model identification information to the installer manager 1111 as information on installable computer programs.

More specifically, in the example illustrated in FIG. 14, the item "installer" of the program information (1) written on lines with line numbers "2" to "11" has the value "printer_driver_installer", indicating that the PD installer 1113 is the installer corresponding to the program information. The installer manager 1111 passes the value of each item of the program information to the PD installer 1113 based on the value "printer_driver_installer" of the item "installer". In this example, the program information (1) includes the item "metadata_url", and thus, the installer manager 1111 also passes the metadata acquired at steps S213 and S214 and corresponding to the program information to the PD installer 1113.

When having received the metadata together with the program information from the installer manager 1111, the PD installer 1113 acquires sub model identification information based on description of the item "model_names" in the metadata. For example, when having received the metadata exemplarily illustrated in FIG. 15, the PD installer 1113 returns the values "MFP Model A type 1 Printer Driver PCL", "MFP Model A type 2 Printer Driver PCL", and "MFP Model A type 3 Printer Driver PCL" written between brackets "[" and "]" of the item "model_names" to the installer manager 1111 as information on installable computer programs.

In addition, for example, if the item "installer" of the program information (i) has the value "scanner_driver_installer", the installer manager 1111 passes information of the items "id", "name", "version", "date", "size", "installer", and "download_url" of the program information to the SD installer 1114, and requests an installable computer program list from the SD installer 1114 (step S219). If the program information (i) includes description of the item "metadata_url", the installer manager 1111 also passes the metadata acquired at steps S213 and S214 to the SD installer 1114.

The SD installer 1114 returns an installable computer program list to the installer manager 1111 based on the passed information (step S220). When having received the metadata, the SD installer 1114 acquires sub model identification information described in the metadata, and returns the acquired sub model identification information to the installer manager 1111 as information on installable computer programs.

More specifically, in the example illustrated in FIG. 14, the item "installer" of the program information written on lines with line numbers "22" to "30" has the value "scanner_driver_installer", indicating that the SD installer 1114 is the installer corresponding to the program information. The installer manager 1111 passes the value of each item of the program information to the SD installer 1114 based on the value of the item "installer".

In this example, the program information (3) does not include the item "metadata_url", and thus, the SD installer 1114 passes the value "MFP Model A Scanner Driver" of the item "name" of the program information (3) to the installer manager 1111 as information on installable computer programs.

The installer manager 1111 executes the above-described processing at steps S213 to S220 for all pieces of program information (i) included in a program information list. Specifically, the processing at each pair of steps S213 and S214, steps S215 and S216, steps S217 and S218, and steps S219 and S220 is selectively executed based on description of the program information (i) in accordance with the processing at steps S102 to S110 in the flowchart illustrated in FIG. 10.

If the item "installer" of the program information (i) has the value "installer_manager", the program information (i) is about installers such as the AP installer 1112, the PD installer 1113, and the SD installer 1114. In this case, the installer manager 1111 performs processing of updating installers in accordance with the processing at steps S106 and S107 in the flowchart illustrated in FIG. 10.

For example, in the program information (7) written on lines with line numbers "59" to "67" illustrated in FIG. 14, the item "installer" has the value "installer_manager", indicating that the program information (7) corresponds to an installer. Which of the AP installer 1112, the PD installer 1113, and the SD installer 1114 the program information (7) corresponds to can be determined based on, for example, the values of the item "id" and the item "name". In the example illustrated in FIG. 14, in the program information (7), the items "id" and "name" have the values "printer driver installer" and "Printer Driver Installer", respectively, indicating that the program information (7) corresponds to the PD installer 1113.

If it is determined that the program information (7) corresponds to the PD installer 1113 based on the values of the items "installer", "id", and "name" of the program information (7), the installer manager 1111 determines whether to update the PD installer 1113 based on the program information (7) (step S222). For example, the installer manager 1111 compares, by a method to be described later, version information of the PD installer 1113 already installed on the client PC 10 with version information indicated by the value of the item "version" of the program information (7). As a result of the comparison, if the version information indicated by the item "version" of the program information (7) indicates a version newer than of the version information of the already installed PD installer 1113, the installer manager 1111 executes update of the PD installer 1113.

In this case, the installer manager 1111 requests a program object for updating the PD installer 1113 from the static server 41 in accordance with the value "https://example.com/printer_driver_installer/object.zip" of the item "download_url" of the program information (7) (step S223). The static server 41 returns the program object for updating the PD installer 1113 to the installer manager 1111 in response to this request (step S224).

Having acquired the program object for updating the PD installer 1113, the installer manager 1111 stops operation of the PD installer 1113 on the client PC 10 (step S225). Then, the installer manager 1111 executes installation processing using the program object acquired at step S224, and updates the PD installer 1113 (step S226). In this example, the installer manager 1111 generates a new PD installer 1113 using the program object, and overwrites the already installed PD installer 1113 with the generated PD installer 1113 to perform the update of the PD installer 1113.

When the update of the PD installer 1113 is completed, the installer manager 1111 activates the updated PD installer 1113 (step S227).

The installer update processing at steps S222 to S227 described above is executed in a manner invisible to the user. The installer update processing can be executed in parallel to the processing of acquiring an installable computer program list at steps S213 to S220.

If it is determined the processing at steps S213 to S220 has ended for all pieces of program information (i) included in the program information list, the installer manager 1111 deletes, from the installable computer program list acquired at steps S216, S218, and S220, a computer program that does not need to be updated, in other words, does not require execution of installation (refer to step S111 illustrated in FIG. 10).

The installer manager 1111 acquires, from the program information list, information and version information of each computer program included in the installable computer program list. The installer manager 1111 also acquires information and version information of any computer program already installed on the client PC 10 by the AP installer 1112, the PD installer 1113, and the SD installer 1114. The information of a computer program may be information of the item "name" in the program information list. The information of the item "name" and version information of an already installed computer program are stored in a predetermined storage area such as the managed area of the OS 110 or a storage area managed by the installer 111.

Information of the item "model_names" of a sub model referred to in the program information (i) by metadata can be used as identification information of a computer program.

The installer manager 1111 compares version information of an already installed computer program and version information of a computer program included in the installable computer program list, between which the information of the item "name" corresponds to each other. As a result of the comparison, the installer manager 1111 determines that, among computer programs included in the installable computer program list, a computer program having a version older than or identical to the version of the corresponding already installed computer program is a computer program that does not need to be updated. The installer manager 1111 deletes information of this computer program that does not need to be updated from the installable computer program list.

The installer manager 1111 keeps, on the installable computer program list, any computer program yet to be installed on the client PC 10 among the computer programs included in the installable computer program list.

The following more specifically describes, with reference to FIG. 17, a method of determining a computer program to be installed by the installer manager 1111 according to the first embodiment. As exemplarily illustrated in FIG. 17, the installer manager 1111 compares the installed version of the computer program with a latest version to determine whether installation of each computer program is possible or unnecessary.

In FIG. 17, the item "computer program" indicates each piece of program information included in the program information list illustrated in FIG. 14, and sub model identification information referred to by metadata included in the program information. The item "installed version" indicates version information of the corresponding computer program already installed on the client PC 10. The item "latest version" indicates version information included in program information acquired from the dynamic server 40. The item "determination result" indicates a result of determination of whether update (installation) of the computer program by the installer manager 1111 is possible (YES) or unnecessary (NO).

The value of the item "installed version" is stored in association with identification information of the computer program by the installer manager 1111 in the storage area managed by the installer manager 1111 or the managed area of the OS 110, for example, when the computer program is installed on the client PC 10 under control of the installer manager 1111.

In FIG. 17, the first to the third rows each indicate version information of the installed version and the latest version of the corresponding one of three pieces of sub model identification information obtained by referring to the metadata described in the program information (1) in FIG. 14. Version information of the latest version of each of these three pieces of sub model identification information has in common the value "1.2.0.0" of version information of a program object corresponding to the program information (1). Only a driver program having the value "1.1.0.0" of version information, which corresponds to the second sub model identification information among the three pieces of sub model identification information, is installed on the client PC 10.

No driver programs corresponding to the first sub model identification information and the third sub model identification information are installed on the client PC 10. The value "1.1.0.0" of the installed version of the already installed driver program corresponding to the second sub model identification information among the three pieces of sub model identification information indicates a version older than the value "1.2.0.0" of a new version. Accordingly, the installer manager 1111 determines that it is possible to update or install the driver program of each of these three pieces of sub model identification information.

In FIG. 17, the fourth to the sixth rows indicate installed version information and latest version information for the program information (3) to (5) in FIG. 14, respectively. In this example, driver programs corresponding to the program information (3) to (5) are already installed on the client PC 10, and the installed versions of the already installed driver programs are the values "1.0.0.0", "1.0.0.0", and "2.1.0.0", respectively. The latest versions of the driver programs described in the program information (3) to (5) are the values "1.0.0.0", "1.0.0.0", and "2.1.0.0", respectively, matching with the current version information. Accordingly, the installer manager 1111 determines that it is unnecessary to install the driver programs corresponding to the program information (3) to (5) onto the client PC 10.

In FIG. 17, the seventh and the eighth rows indicate version information of the installed versions and the latest versions of the program information (6) and (7) in FIG. 14, respectively. In this example, no computer program (application program) corresponding to the program information (6) is installed on the client PC 10. The latest version of the computer program (PD installer 1113) corresponding to the program information (7) has the value "2.0.0.0", and the installed version of a computer program already installed on the client PC 10 has the value "1.0.0.0", and thus is older than the latest version. Accordingly, the installer manager 1111 determines that it is possible to install the computer programs corresponding to the program information (6) and (7) onto the client PC 10.

In FIG. 11, the installer manager 1111 passes, to the UI unit 1110, information on the installable computer program list from which information on any computer program that does not need to be updated or installed is deleted, and instructs the UI unit 1110 to display the installable computer program list (step S221). In response to this instruction, the UI unit 1110 produces an installable computer program list display screen based on the information passed from the installer manager 1111, and passes the screen to the display unit 101.

Figure 18:
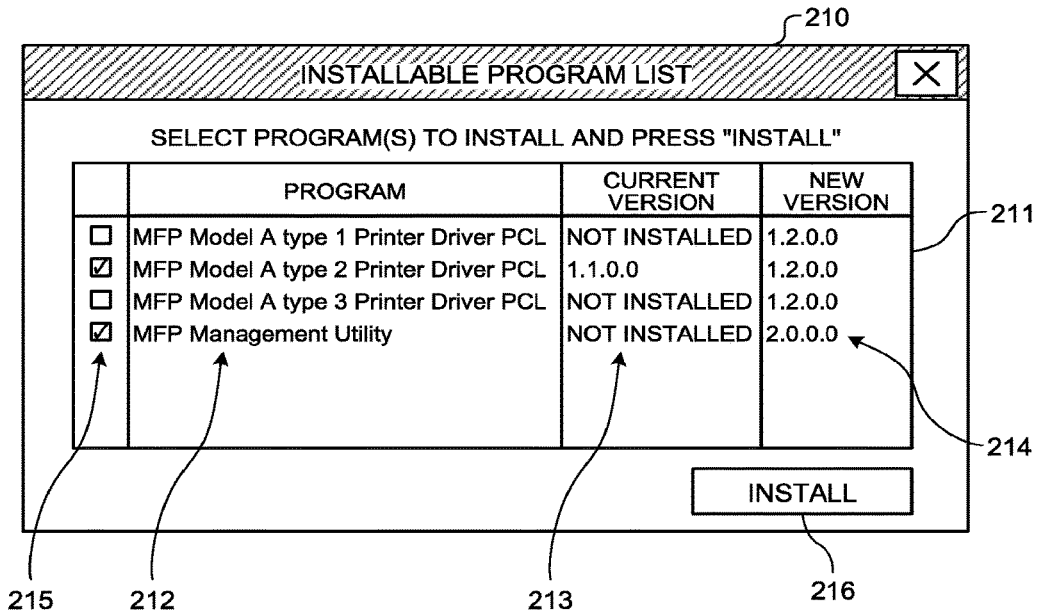
FIG. 18 is a diagram illustrating an exemplary installable computer program list display screen according to the first embodiment.

FIG. 18 illustrates an exemplary installable computer program list display screen according to the first embodiment. In FIG. 18, a display area 211 and a button 216 are arranged on a list display screen 210. The display area 211 includes a list display part 212, a current version display part 213, a new version display part 214, and a selection input part 215.

The list display part 212 displays a list of computer programs included in the installable computer program list passed from the installer manager 1111 at step S221. The current version display part 213 and the new version display part 214 display the installed and latest versions, respectively, of any computer program displayed in the list display part 212. The current version display part 213 preferably displays information indicating a not-installed state, as exemplarily illustrated in FIG. 18, for any computer program not installed on the client PC 10 among computer programs displayed in the list display part 212. The selection input part 215 selects a computer program displayed in the list display part 212. In this example, check boxes are provided in the selection input part 215. When operated, the button 216 fixes selection input on the selection input part 215.

In the example illustrated in FIG. 18, the list display part 212 displays a list of any computer program having a determination result of "YES" in FIG. 17 described above. As described above, the installer update processing at steps S222 to S227 is executed in a manner invisible to the user. Thus, when it is possible to install installers such as the AP installer 1112, the PD installer 1113, and the SD installer 1114, no information on these installers is displayed in the list display part 212.

In FIG. 11, a computer program to be installed is selected through a user operation in response to the list display screen 210, and the UI unit 1110 is instructed to perform installation of the selected computer program (step S228). In response to this instruction, the UI unit 1110 passes information indicating the selected computer program to the installer manager 1111, and instructs the installer manager 1111 to execute installation of the selected computer program (step S229).

In response to this instruction, the installer manager 1111 refers to the program information (i) for each selected computer program, to requests a program object from the static server 41 in accordance with the value of the item "download_url" in the program information (i) of the installation target (step S230). The static server 41 transmits the program object to the installer manager 1111 in response to this request (step S231).

The installer manager 1111 causes, for the program object transmitted from the static server 41, installation processing to be executed by an installer corresponding to the value of the item "installer" of the program information (i) of the installation target among the AP installer 1112, the PD installer 1113, and the SD installer 1114.

For example, when the value of the item "installer" in the program information (i) of the installation target is the value "application_installer" indicating the AP installer 1112, the installer manager 1111 instructs the AP installer 1112 to perform installation processing with the program object acquired from the static server 41 (step S232). In response to this instruction, the AP installer 1112 refers to the value of each item of the program information (i) to execute installation processing with the program object (step S233). When the OS 110 is Windows (registered trademark), this installation processing includes initial setting of the registry.

When the program information (i) of the installation target includes the metadata illustrated in FIG. 16, the AP installer 1112 also performs processing of writing initial setting to the managed area of the OS 110 in accordance with information described in the metadata. Upon completion of the installation processing, the AP installer 1112 notifies the installer manager 1111 of the completion of the processing (step S234).

For example, when the value of the item "installer" in the program information (i) of the installation target is the value "printer_driver_installer" indicating the PD installer 1113, the installer manager 1111 instructs the PD installer 1113 to perform installation processing with the program object acquired from the static server 41 (step S235). In response to this instruction, the PD installer 1113 refers to the value of each item of the program information (i) to execute installation processing with the program object. Upon completion of the installation processing, the PD installer 1113 notifies the installer manager 1111 of the completion (step S236).

Similarly, when the value of the item "installer" in the program information (i) of the installation target is the value "scanner_driver_installer" indicating the SD installer 1114, the installer manager 1111 instructs the SD installer 1114 to perform installation processing with the program object acquired from the static server 41 (step S237). In response to this instruction, the SD installer 1114 refers to the value of each item of the program information (i) to execute installation processing with the program object. Upon completion of the installation processing, the SD installer 1114 notifies the installer manager 1111 of the completion (step S238).

Having acquired the notification of installation completion for all computer programs instructed at step S229, the installer manager 1111 notifies the UI unit 1110 of the completion of the installation processing (step S240). In response to this notification, the UI unit 1110 produces a completion notifying screen indicating the completion of the installation processing, and passes the screen to the display unit 101.

Figure 19:
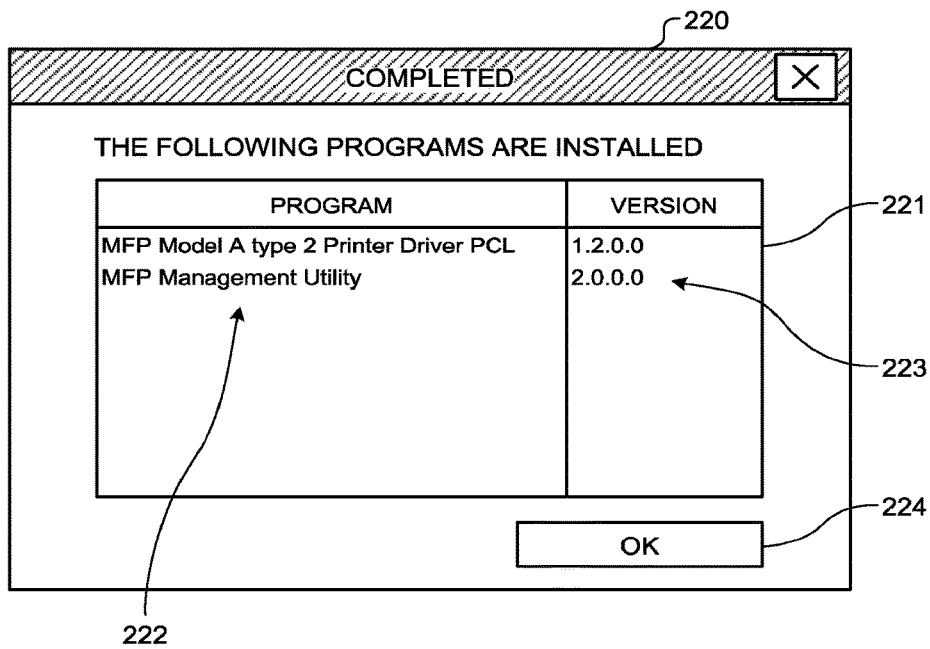
FIG. 19 is a diagram illustrating an exemplary completion notifying screen according to the first embodiment.

FIG. 19 illustrates an exemplary completion notifying screen according to the first embodiment. In FIG. 19, a display area 221 and a button 224 are arranged on a completion notifying screen 220. The display area 221 includes a list display part 222 and a version display part 223.

The list display part 222 displays a list of any computer program for which the notification of completion of the installation processing is acquired at steps S234, S236, and S238 described above. When the processing of updating installers such as the AP installer 1112, the PD installer 1113, and the SD installer 1114 is performed, no information on an updated installer is displayed in the list display part 222. The version display part 223 displays version information of each computer program displayed in the list display part 222. When operated, the button 224 ends the series of installation processing.

Second Embodiment

The following describes a second embodiment. In the first embodiment described above, installation or update is executed on a kind of computer program with which the installer 111 is already compatible. In the second embodiment, however, installation can be executed on a kind of computer program with which the installer 111 is not compatible.

The configurations of the information processing system, the client PC 10, and the installer 111 described with reference to, for example, FIGS. 1 to 6 in the first embodiment described above applicable to the second embodiment, and thus description thereof will be omitted below. In the following, as appropriate, a "computer program of a kind with which the installer 111 is not compatible" is referred to as a "new kind of computer program", and an installer used to install the new kind of computer program is referred to as a "new kind of installer".

Figure 20:
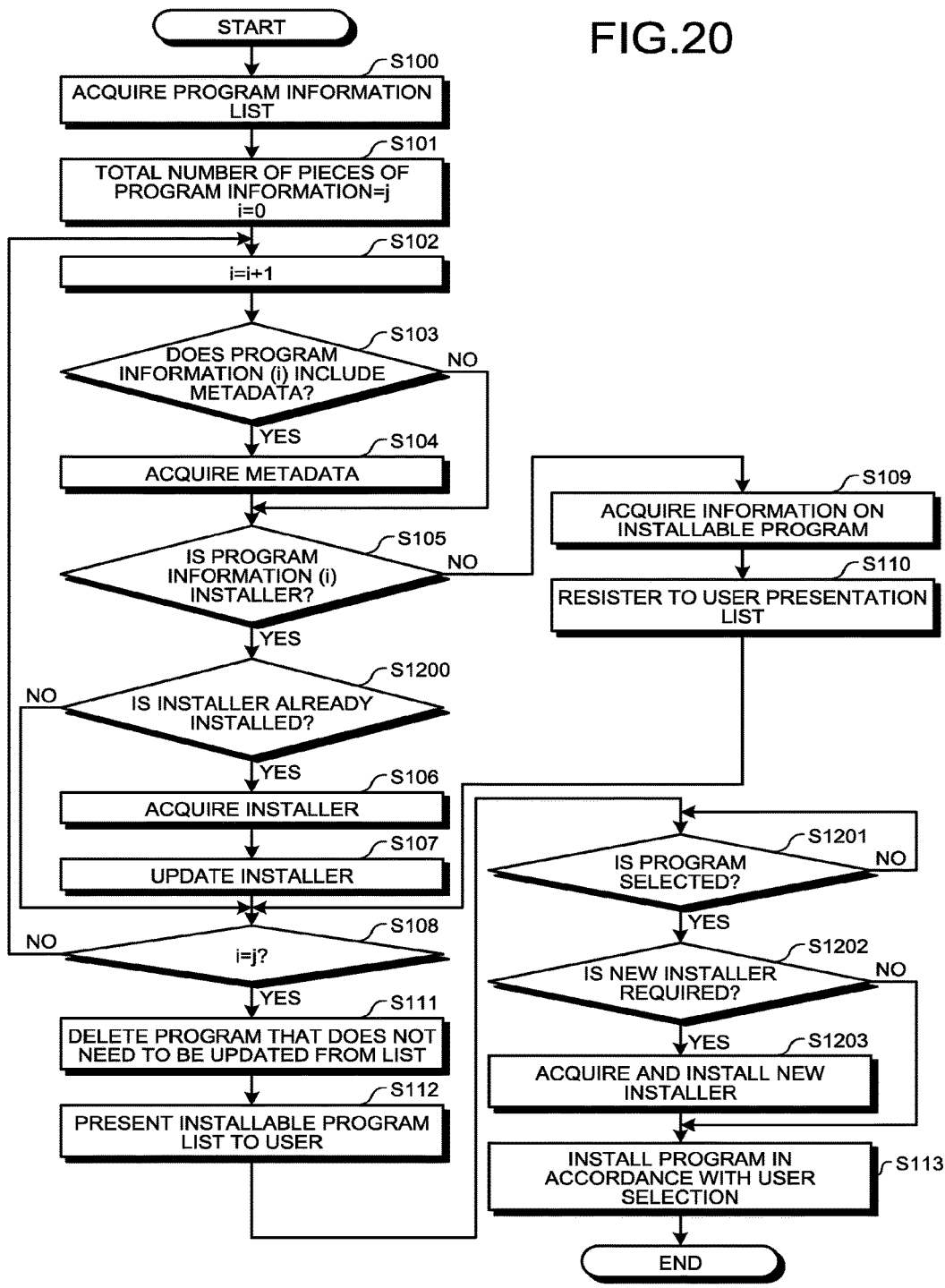
FIG. 20 is an exemplary flowchart of installation processing according to a second embodiment.

FIG. 20 is an exemplary flowchart of installation processing according to the second embodiment. Each processing of the flowchart illustrated in FIG. 20 is executed by the installer 111. In FIG. 20, the same processing as in the flowchart illustrated in FIG. 10 described above is denoted by an identical reference sign, and detailed description thereof will be omitted. Specifically, the flowchart illustrated in FIG. 20 includes processing at steps S1200 to S1203 in addition to the flowchart illustrated in FIG. 10.

Similarly to the flowchart illustrated in FIG. 10, the installer 111 acquires a program information list from the dynamic server 40 at step S100. Then, the installer 111 executes the processing at steps S102 to S110 for each program information (i) included in the program information list.

At step S105, the installer 111 determines whether a computer program indicated by the program information (i) is an installer. If it is determined that the computer program indicated by the program information (i) is not an installer, the installer 111 proceeds the process to step S109 in a manner similarly to the above.

At step S109, the installer 111 passes the program information (i) to an installer indicated by the program information (i), and acquires information on installable computer programs. If a computer program according to the program information (i) is a new kind of computer program, the installer 111 does not include a new kind of installer for installing the new kind of computer program. In this case, the installer 111 extracts, for example, a display name (the value of the item "name") included in the program information (i), and acquires the display name as information on installable computer programs.

If it is determined that the computer program indicated by the program information (i) is an installer, the installer 111 proceeds the process to step S1200. At step S1200, the installer 111 determines whether an installer indicated by the program information (i) is an installer already installed on the client PC 10.

For example, the installer 111 refers to the value of the item "installer" in the program information (i), and determines whether this value corresponds to any installer already included in the installer 111. If the value of the item "installer" corresponds to any installer already included in the installer 111, the installer 111 determines that the installer 111 indicated by the program information (i) is an installer already installed on the client PC 10.

If it is determined that the installer indicated by the program information (i) is an installed installer, the installer 111 proceeds the process to step S106 to acquire the installer indicated by the program information (i), and updates the installed installer with the acquired installer at step S107. Then, the installer 111 proceeds the process to step S108.

If it is determined that the installer indicated by the program information (i) is an installer not installed, in other words, a new kind of installer, the installer 111 proceeds the process to step S108. Specifically, the installer 111 does not perform acquisition and installation of the new kind of installer at this stage.

The installer 111 executes the processing at steps S102 to S110 for all pieces of program information (i) included in the program information list, and then proceeds the process to step S111. At step S111, in a manner similarly to the above, the installer 111 deletes a computer program that does not need to be updated from an installable computer program list to be presented to the user. At the subsequent step S112, the installer 111 presents, to the user, the installable computer program list from which the computer program that does not need to be updated is deleted. The installer 111 causes the display unit 101 to display, for example, the list display screen 210 illustrated in FIG. 18 to present the installable computer program list to the user. This installable computer program list may include information on a new kind of computer program.

At the subsequent step S1201, the installer 111 determines whether a computer program to be installed is selected by the user from the presented installable computer program list. For example, when the button 216 for instructing installation is operated on the list display screen 210, the installer 111 determines that selection is performed by the user. When having determined that no selection is performed by the user, the installer 111 returns the process to step S1201.

If it is determined that the user has selected a computer program to be installed, the installer 111 proceeds the process to step S1202. At step S1202, the installer 111 determines whether installation of the computer program selected by the user requires a new kind of installer. If it is determined that no new kind of installer is required, the installer 111 proceeds the process to step S113.

For example, the installer 111 acquires the value of the item "installer" of the program information corresponding each selected computer program. The installer 111 determines which of the installers 1112, 1113, and 1114 included in the installer 111 the acquired value indicates. As a result, if it is determined that the acquired value indicates none of the installers 1112, 1113, and 1114, the installer 111 determines that the computer program corresponding to this program information is a new kind of computer program, and a new kind of installer is needed to install the computer program.

If it is determined that a new kind of installer is needed at step S1202, the installer 111 proceeds the process to step S1203. At step S1203, the installer 111 acquires the new kind of installer, and executes installation of the acquired installer.

The installer 111 acquires a new kind of installer by, for example, a method described below. The installer 111 selects first program information, the item "installer" of which has the value "installer_manager", from among all pieces of program information included in the program information list, and acquires the value of the item "id" from the selected first program information. If the acquired value of the item "id" corresponds to the value of the item "installer" of second program information corresponding to a new kind of computer program, the installer 111 determines that the first program information corresponds to a new kind of installer for installing the new kind of computer program corresponding to the second program information. Then, the installer 111 acquires the new kind of installer in accordance with description of the first program information, and installs the acquired new kind of installer on the client PC 10.

At step S113, the installer 111 installs any computer program selected by the user on the client PC 10. In this case, a new kind of installer is already installed, and thus installing processing of the new kind of computer program is executable. Upon completion of installation of all selected computer programs, the installer 111 ends the series of processing of the flowchart illustrated in FIG. 20.

The following describes the installation processing according to the second embodiment with a more specific example. As described above, the installer 111 initially includes the installers 1112, 1113, and 1114 configured to install an application program, a printer driver program, and a scanner driver program, respectively.

FIG. 21 illustrates, for description of the processing according to the second embodiment, an exemplary program information list including the program information of a new kind of computer program and the program information of a new kind of installer. In the example illustrated in FIG. 21, between brackets "{" and "}" in the program information list, the program information (1) is described on lines with line numbers "2" to "10", and the program information (2) is described on lines with line numbers "11" to "19".

In FIG. 21, in the program information (1), which is related to a port monitor program (hereinafter referred to as a port monitor), the item "id" has the value "portmonitor_filter_a", indicating the kind of computer program, and the item "name" has the value "PortMonitor Filter A". The item "installer" has the value "portmonitor_installer", indicating that a port monitor installer (hereinafter referred to as a PM installer) is used to install the computer program corresponding to the program information (1).

In FIG. 21, in the program information (2), the item "installer" has the value "installer_manager", indicating an installer configured to install a computer program. In the program information (2), the item "id" has the value "port-monitor_installer", indicating a PM installer compatible with installation of a port monitor.

A PM installer is a new kind of installer not initially installed in the installer 111. The port monitor corresponding to the program information (1) and installed by the PM installer as a new kind of installer is a new kind of computer program.

The installer 111 acquires the program information list exemplarily illustrated in FIG. 21 at step S100. In this case, in the flowchart illustrated in FIG. 20, the installer 111 determines that a computer program indicated by the program information (1) is not an installer at step S105, and acquires information on installable computer programs in the program information (1) at step S109.

In this example, the program information (1) includes no metadata, and thus, the installer 111 acquires a display name included in the program information (1), which is the value "PortMonitor Filter A" of the item "name", as information on installable computer programs. Then, at step S110, the installer 111 registers the information on computer programs acquired at step S109 to an installable computer program list to be presented to the user.

For the program information (2), however, the installer ill determines that a computer program indicated by the program information (2) is an installer at step S105 illustrated in FIG. 20. Then, the installer 111 proceeds the process to step S1200 to determine whether an installer indicated by the program information (2) is already installed on the installer 111. In the example illustrated in FIG. 21, the installer indicated by the program information (2) is a PM installer. Accordingly, the installer 111 determines that the installer indicated by the program information (2) is not installed on the installer 111, and proceeds the process to step S108, skipping the processing at steps S106 and S107 illustrated in FIG. 20.

If the processing has ended for all pieces of program information (i) included in the program information list, the installer 111 proceeds the process to step S111. At step S111, the installer 111 deletes any computer program that does not need to be updated from the installable computer program list to be presented to the user.

Figures 22, 23:
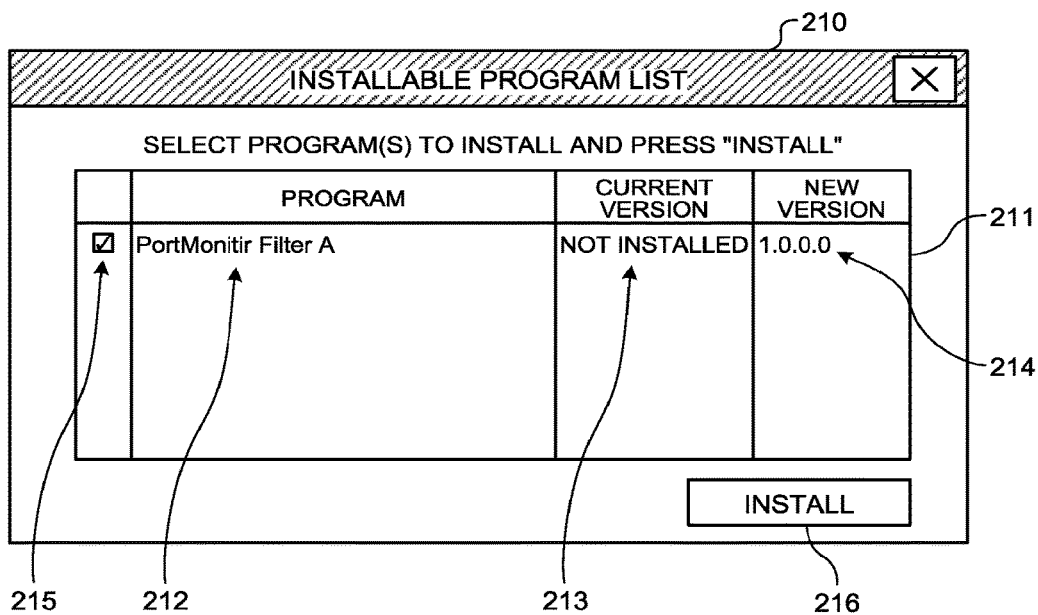
FIG. 22 is a diagram for description of a method of determining a computer program to be installed according to the second embodiment.
FIG. 23 is a diagram illustrating an exemplary installable computer program list display screen according to the second embodiment.

Specifically, the installer 111 compares an installed version and a latest version for each of the program information (1) and the program information (2) as exemplarily illustrated in FIG. 22. In this case, a new kind of computer program indicated by the program information (1) is not installed on the client PC 10, and thus, it is determined that installation thereof is possible. Similarly, a new kind of installer indicated by the program information (2) is not installed on the installer 111, and it is determined that installation thereof is possible.

At the subsequent step S112, the installer 111 causes the display unit 101 to display the installable computer program list. In this example, as illustrated in FIG. 23, the value "PortMonitor Filter A" of the item "name" of the program information (1) is displayed as information indicating a new kind of computer program in the list display part 212 inside the list display screen 210. The computer program corresponding to the program information (2) is an installer, and thus is not displayed in the list display part 212.

When "PortMonitor Filter A" indicating a port monitor as a new kind of computer program is checked and the button 216 is operated on the list display screen 210 illustrated in FIG. 23, the process proceeds to step S1202. Steps S106 and S107 are skipped upon the determination at step S1200 described above, and thus, a PM installer for installing a port monitor is yet to be installed on the installer 111. Thus, the installer 111 acquires a PM installer from the static server 41 and installs the PM installer at step S1203 in accordance with description of the program information (2) to include the PM installer.

Figure 24:
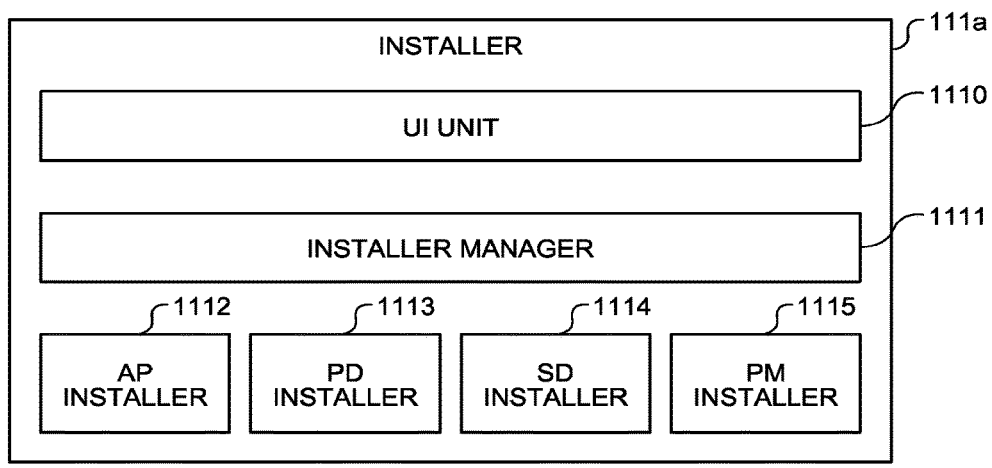
FIG. 24 is a diagram for description of an installer to which a new kind of installer is added according to the second embodiment.

FIG. 24 illustrates an example in which a PM installer as a new kind of installer is added to the installer 111 illustrated in FIG. 6 and installed according to the second embodiment. In FIG. 24, the same part as in FIG. 6 described above is denoted by an identical reference sign, and detailed description thereof will be omitted.

In FIG. 24, an installer 111a includes a PM installer 1115 in addition to the UI unit 1110, the installer manager 1111, the AP installer 1112, the PD installer 1113, and the SD installer 1114 of the installer 111 illustrated in FIG. 6. The installer 111a can execute, through the additionally provided PM installer 1115, installation of a port monitor on the client PC 10 at step S113 illustrated in FIG. 20.

According to the second embodiment, the installer 111 can install an installer not installed, when the installer not installed is required at installation of a computer program. With this configuration, the number of kinds of computer program with which the installer 111 is compatible can be increased, thereby extending the function of the installer 111.

Third Embodiment

The following describes a third embodiment. In the first and the second embodiments described above, only the installer manager 1111 performs communication between the dynamic server 40 and the static server 41. In the third embodiment, however, each installer (for example, the AP installer 1112, the PD installer 1113, and the SD installer 1114) as well as the installer manager 1111 has functions of a program information acquisition unit configured to acquire program information, a computer program acquisition unit configured to acquire a computer program, and an installation control unit configured to control installation processing. Thus, each installer according to the third embodiment can perform communication with the dynamic server 40 and the static server 41 to acquire, for example, program information, metadata, and a program object. Accordingly, when a computer program is additionally required to install an installation target computer program, each installer can easily acquire this required computer program and efficiently execute the processing of installing the installation target computer program.

Figure 25:
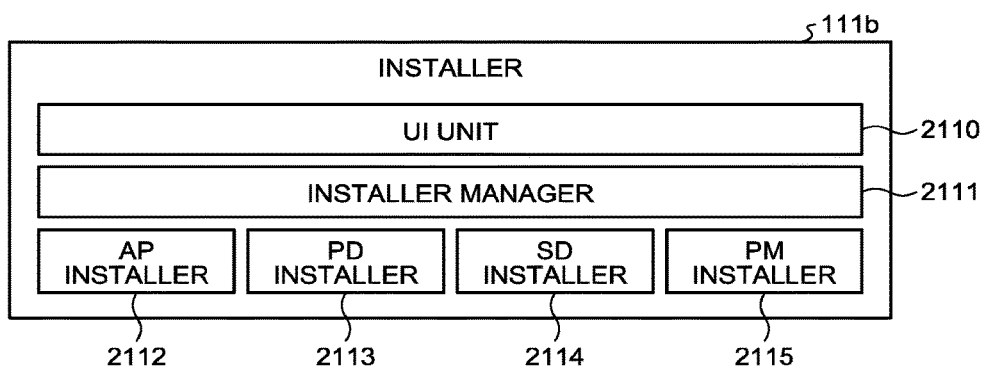
FIG. 25 is a block diagram of an exemplary configuration of an installer according to a third embodiment.

FIG. 25 illustrates an exemplary configuration of an installer according to the third embodiment. In FIG. 25, similarly to the installer 111 according to the first embodiment described with reference to FIG. 6, an installer 111b includes an UI unit 2110, an installer manager 2111, and installers. In the example illustrated in FIG. 25, the installers include an AP installer 2112, a PD installer 2113, a SD installer 2114, and a PM installer 2115.

In the following, a computer program needs to install another computer program is referred to as a related computer program unless otherwise stated. Each installer included in the installer 111b is referred to as a program installer as appropriate to distinguish this installer from the installer 111b. In the example illustrated in FIG. 25, the AP installer 2112, the PD installer 2113, the SD installer 2114, and the PM installer 2115 are collectively referred to as the program installer.

The UI unit 2110, the installer manager 2111, and the program installers included in the installer 111*b* according to the third embodiment have functions partially different from the program installers included in the installer 111 illustrated in FIG. 6.

For example, the PD installer 2113 executes installation processing of, on the client PC 10, a printer driver program (hereinafter referred to as a printer driver) of a model with which the installer is compatible. More specifically, the PD installer 2113 installs the printer driver on the client PC 10, and sets a printing port of the client PC 10 used by the installed printer driver. The PD installer 2113 performs, for example, production of a logical printer queue, and processing of registering information on the installed printer driver to the client PC 10.

The SD installer 2114 executes processing of installing, on the client PC 10, a scanner driver program (hereinafter referred to as a scanner driver) of a model with which the installer is compatible. More specifically, the SD installer 2114 installs the scanner driver on the client PC 10, and sets a scan port of the client PC 10 used by the installed scanner driver.

The PM installer 2115 installs a port monitor program (port monitor) configured to monitor various ports of the client PC 10 on which installation is performed. The port monitor needs to be installed in advance before a related computer program (for example, a printer driver or a scanner driver) using a port is installed on the client PC 10.

The PD installer 2113, the SD installer 2114, and the PM installer 2115 according to the third embodiment execute discovery of any external instrument connected with the network 22 in the same segment as the client PC 10 on which each driver or monitor is installed, acquisition of instrument information on any external instrument detected through the discovery, acquisition of OS information of the client PC 10, issuing of a query to the dynamic server 40, and request to the static server 41 to acquire metadata and a program object (driver program, monitor program body).

The AP installer 2112 executes processing of installing a normal application program (hereinafter referred to as an application) on the client PC 10. Applications installed by the AP installer 2112 include a projection application, an electronic blackboard viewer application, an image forming device operation application, and a communication setting tool described in the above-described first embodiment.

The printer driver, the scanner driver, and the port monitor described above are each different from a normal application in that the printer driver, the scanner driver, and the port monitor are each installed on the client PC 10 in accordance with a place and a method defined by the OS. For example, a normal application may be installed at a place specified by the OS by a method specified by the OS, or may be installed at a place unique to this application by a method unique to this application.

Figure 26:
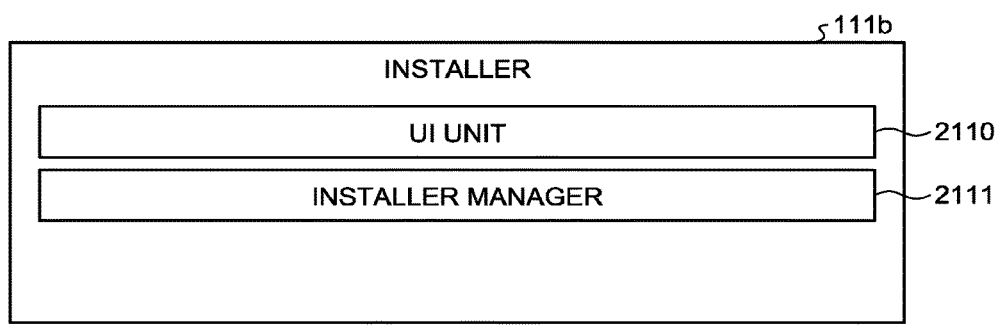
FIG. 26 is a block diagram of an exemplary configuration of the installer including no program installer according to the third embodiment.

The installer 111*b* according to the third embodiment can be installed on the client PC 10, without including the program installers (the AP installer 2112, the PD installer 2113, the SD installer 2114, and the PM installer 2115 in the example illustrated in FIG. 25) in advance. FIG. 26 illustrates an exemplary configuration of the installer 111*b* including no program installer according to the third embodiment. In FIG. 26, the installer 111*b* only includes the UI unit 2110 and the installer manager 2111.

When the installer manager 2111 installs a program installer, the program installer to be installed needs another program installer in some cases. In the third embodiment, in such a case, the program installer to be installed can acquire and execute the other program installer. With this configuration, a load of installation processing on the user is reduced to allow more flexible installation processing.

The following describes an example in which a printer driver corresponding to a printer device is installed on the client PC 10 by the installer 111*b* not including the program installers illustrated in FIG. 26. In this case, the installer manager 2111 acquires, through the network 30, the PD installer 2113 for installing the printer driver on the client PC 10 in response to an instruction from the UI unit 2110. The installer manager 2111 also acquires, through the network 30, the AP installer 2112 for installing a utility program corresponding to the printer driver.

The installer manager 2111 activates the acquired AP installer 2112, and installs the application on the client PC 10.

The installer manager 2111 also activates the acquired PD installer 2113, and starts the processing of installing the printer driver on the client PC 10. As described above, at installation of a printer driver, setting of a port used by this printer driver needs to be performed in advance. In the third embodiment, the PD installer 2113 acquires, through the network 30, the PM installer 2115 for installing a port monitor configured to monitor ports, and activates the PM installer 2115 to install the port monitor on the client PC 10. After the processing of installing the port monitor is completed, the PD installer 2113 executes installation of the printer driver.

Figure 27:
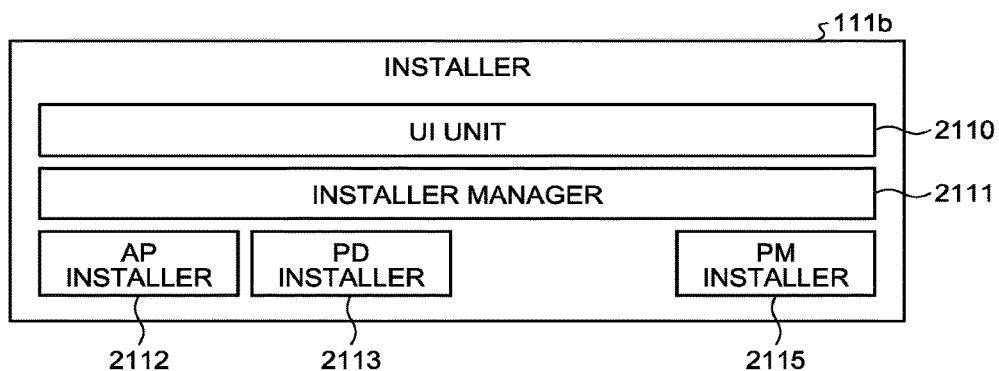
FIG. 27 is a block diagram of an exemplary result of executing processing of installing a printer driver on the installer including no program installer according to the third embodiment.

FIG. 27 illustrates an exemplary result of execution of the above-described processing of installing the printer driver on the installer 111*b* in the state illustrated in FIG. 26 according to the third embodiment. Along with the installation of the printer driver, the PM installer 2115 is installed on the client PC 10 together with the AP installer 2112 and the PD installer 2113, and included in the installer 111*b*.

In this manner, in the third embodiment, at the processing of installing the printer driver by the PD installer 2113, any related computer program of the printer driver is automatically installed. With this configuration, the processing of installing a driver program can be more easily performed, thereby enabling simple execution of installation processing when a plurality of different driver programs are installed.

The following describes the installation processing according to the third embodiment in more detail with reference to flowcharts illustrated in FIGS. 28 and 29.

First, processing of the flowchart illustrated in FIG. 28 will be described. FIG. 28 illustrates exemplary processing of installing a program installer (for example, one or more installers of the AP installer 2112, the PD installer 2113, the SD installer 2114, and the PM installer 2115) by the installer manager 2111. Each processing in the flowchart illustrated in FIG. 28 is executed by the installer 111*b*, more specifically, by the UI unit 2110 and the installer manager 2111 included in the installer 111*b*.

At step S300, the installer manager 2111 executes search of any external instrument through the network 22 and query to the dynamic server 40, and acquires an installer information list indicating any program installer installable on the client PC 10.

In the installer 111*b*, the installer manager 2111 initializes the variable i to be the value "0" (step S301). The value j represents the total number of pieces of the installer information acquired at step S300.

The subsequent processing at steps S302 to S305 is executed for all pieces of installer information acquired at step S300. In the following, the i-th installer information is referred to as installer information (i).

The installer manager 2111 increments the variable i by one at step S302, and determines whether the installer information (i) includes metadata (meta information) at step S303. If it is determined that the installer information (i) includes no metadata, the installer manager 2111 proceeds the process to step S305. If it is determined that the installer information (i) includes metadata, the installer manager 2111 proceeds the process to step S304 to acquire the metadata from the static server 41 based on description of the installer information (i). Having acquired the metadata, the installer manager 2111 proceeds the process to step S305.

At step S305, the installer manager 2111 determines whether the variable i matches with the value j as the total number of pieces of installer information. If the variable i matches with the value j, the installer manager 2111 determines that processing has ended for all pieces of installer information acquired at step S300, and proceeds the process to step S306. If it is determined that the variable i does not match with the value j, the installer manager 2111 returns the process to step S302 to increment the variable i by one, and executes processing on the next installer information (i).

At step S306, the installer manager 2111 causes the display unit 101 to display an installer information list through the UI unit 2110 to present the installer information list to the user. The user can select one or more program installers to be installed on the client PC 10 from the installer information list.

At the subsequent step S307, the installer manager 2111 waits for selection input by the user on the installer information list presented to the user. If it is determined that no selection input is performed by the user because no notification is received from the UI unit 2110, the installer manager 2111 returns the process to step S307. If it is determined that the selection input is performed by the user based on notification from the UI unit 2110, the installer manager 2111 proceeds the process to step S308.

The installer manager 2111 initializes a variable k to be the value "0" (step S308). The total number of pieces of installer information selected by the user at step S307 is denoted by a value 1. The installer manager 2111 receives the value 1 of the total number of selected pieces of installer information through notification of the user selection input from the UI unit 2110.

The subsequent processing at steps S309 to S312 is executed for all pieces of installer information, notification of which is given by the UI unit 2110 at step S307.

The installer manager 2111 increments the variable k by one at step S309, at the subsequent step S310, and acquires, from the static server 41, a program object (k) of an installer program corresponding to the k-th installer information based on description of the k-th installer information. At the subsequent step S311, the installer manager 2111 installs, on the client PC 10, an installer program as the program object (k) acquired at step S310.

At the subsequent step S312, the installer manager 2111 determines whether the variable k matches with the value 1 of the total number of pieces of installer information. If it is determined that the variable k does not match with the value 1, the installer manager 2111 returns the process to step S309. If it is determined that the variable k matches with the value 1, the installer manager 2111 determines that processing has ended for all pieces of installer information, notification of which is given by the UI unit 2110, at step S307, and ends the series of processing of the flowchart illustrated in FIG. 28.

The following describes processing of the flowchart illustrated in FIG. 29. FIG. 29 illustrates exemplary processing of installing a related computer program by each installer. The processing of the flowchart illustrated in FIG. 29 is started when one program installer for installing a driver program is activated among program installers installed on the client PC 10 through the processing of the flowchart illustrated in FIG. 28 described above. In the example illustrated in FIG. 25, the processing of the flowchart illustrated in FIG. 29 is started, for example, when any one of the PD installer 2113 and the SD installer 2114 is activated. In the following, an activated program installer is referred to as a target program installer.

At step S320, the target program installer executes search of any external instrument through the network 22 and query to the dynamic server 40, and acquires driver information as information on a driver program corresponding to the target program installer. When the target program installer is compatible with a plurality of driver programs, the target program installer acquires a list of driver information. At the subsequent step S321, when driver information included in the driver information list acquired at step S320 includes metadata, the target program installer acquires the metadata from the static server 41.

At the subsequent step S322, the target program installer causes the display unit 101 to display the list of driver information acquired at step S320 through the UI unit 2110 to present the list to the user. The user can select one or more driver programs to be installed on the client PC 10 from the list of driver information.

At the subsequent step S323, the target program installer waits for selection input by the user on the list of driver information presented to the user. If it is determined that no selection input is performed by the user because no notification is received from the UI unit 2110, the target program installer returns the process to step S323. If it is determined that the selection input is performed by the user based on notification from the UI unit 2110, the target program installer proceeds the process to step S324.

The target program installer initializes a variable m to be the value "0" (step S324). The total number pieces of driver information (driver program) selected by the user at step S323 is denoted by a value n. The target program installer receives the value n of the total number of selected pieces of driver information through notification of the user selection input from the UI unit 2110.

At the subsequent step S325, the target program installer determines, based on the driver information selected at step S323, whether the target program installer needs to be updated. For example, the target program installer compares version information included in installer information of the target program installer with version information included in the selected driver information to determine whether the target program installer needs to be updated. If it is determined that the target program installer needs to be updated, the target program installer proceeds the process to step S329.

If it is determined that the target program installer needs to be updated at step S325, the target program installer instructs the installer manager 2111 to update the target program installer. The process proceeds to step S326, and the installer manager 2111 acquires information on an update program of the target program installer from the dynamic server 40. If this update program information includes metadata, the installer manager 2111 acquires the metadata from the static server 41 (step S327).

At the subsequent step S328, the installer manager 2111 stops the current operation of the target program installer, executes update of the target program installer, and installs the updated target program installer on the client PC 10.

For example, the installer manager 2111 acquires a program object of the update program from the static server 41 based on the update program information and the metadata acquired at steps S326 and S327. After having stopped the current operation of the target program installer, the installer manager 2111 installs, on the client PC 10, a program installer as the program object of the acquired update program to obtain the updated target program installer.

When the processing of updating the target program installer is completed, the installer manager 2111 activates a new target program installer.

The subsequent processing at steps S329 to S341 is executed for all pieces of installer information, notification of which is given by the UI unit 2110 at step S323.

The target program installer increments the variable m by one at step S329, and determines whether a driver program of the driver information (m) needs a related computer program at the subsequent step S330. If it is determined that a related computer program is needed, the target program installer proceeds the process to step S339.

If it is determined that the driver program of the driver information (m) needs a related computer program at step S330, the target program installer proceeds the process to step S331 to determine whether this related computer program is already installed on the client PC 10. If it is determined that the related computer program is already installed, the target program installer proceeds the process to step S339. If it is determined that the related computer program is yet to be installed, the target program installer proceeds the process to step S332.

At step S332, the target program installer determines whether an installer program (referred to as a related program installer) for installing the related computer program is already installed on the client PC 10. If it is determined that the related program installer is already installed, the target program installer proceeds the process to step S335. If it is determined that the related program installer is yet to be installed, the target program installer proceeds the process to step S333.

At step S333, the target program installer acquires the related program installer from, for example, the static server 41. For example, the target program installer executes query to the dynamic server 40 to acquire a list of information on the related program installer, and acquires metadata from the static server 41 based on this acquired related program installer information. Then, the target program installer acquires a program object of the related program installer from the static server 41 based on the acquired related program installer information and metadata.

At the subsequent step S334, the target program installer installs the related program installer on the client PC 10 through the program object of the related program installer acquired at step S333. When the installation is completed, the target program installer activates the related program installer.

The activated related program installer executes query to the dynamic server 40 at the subsequent step S335 to acquire program information of the related computer program. If it is determined that the related computer program includes metadata based on the program information of the related computer program, the related program installer acquires the metadata from the static server 41 (step S336).

At the subsequent step S337, the related program installer acquires the program object of the related computer program from the static server 41 based on the acquired program information and metadata of the related computer program. Then, at the subsequent step S338, the related program installer installs the related computer program on the client PC 10 through the acquired program object of the related computer program.

At the subsequent step S339, the target program installer acquires a program object of the driver program of the driver information (m) from the static server 41. Then, at the subsequent step S340, the target program installer installs the driver program of the driver information (m) on the client PC 10 through the program object acquired at step S339.

At the subsequent step S341, the target program installer determines whether the variable m matches with the value n of the total number of pieces of driver information selected by the user. If it is determined that the variable m does not match with the value n, the target program installer returns the process to step S329. If it is determined that the variable m matches with the value n, the target program installer determines that processing has ended for all driver information, notification of which is given by the UI unit 2110 at step S323, and ends the series of processing of the flowchart illustrated in FIG. 29.

Figure 30A:
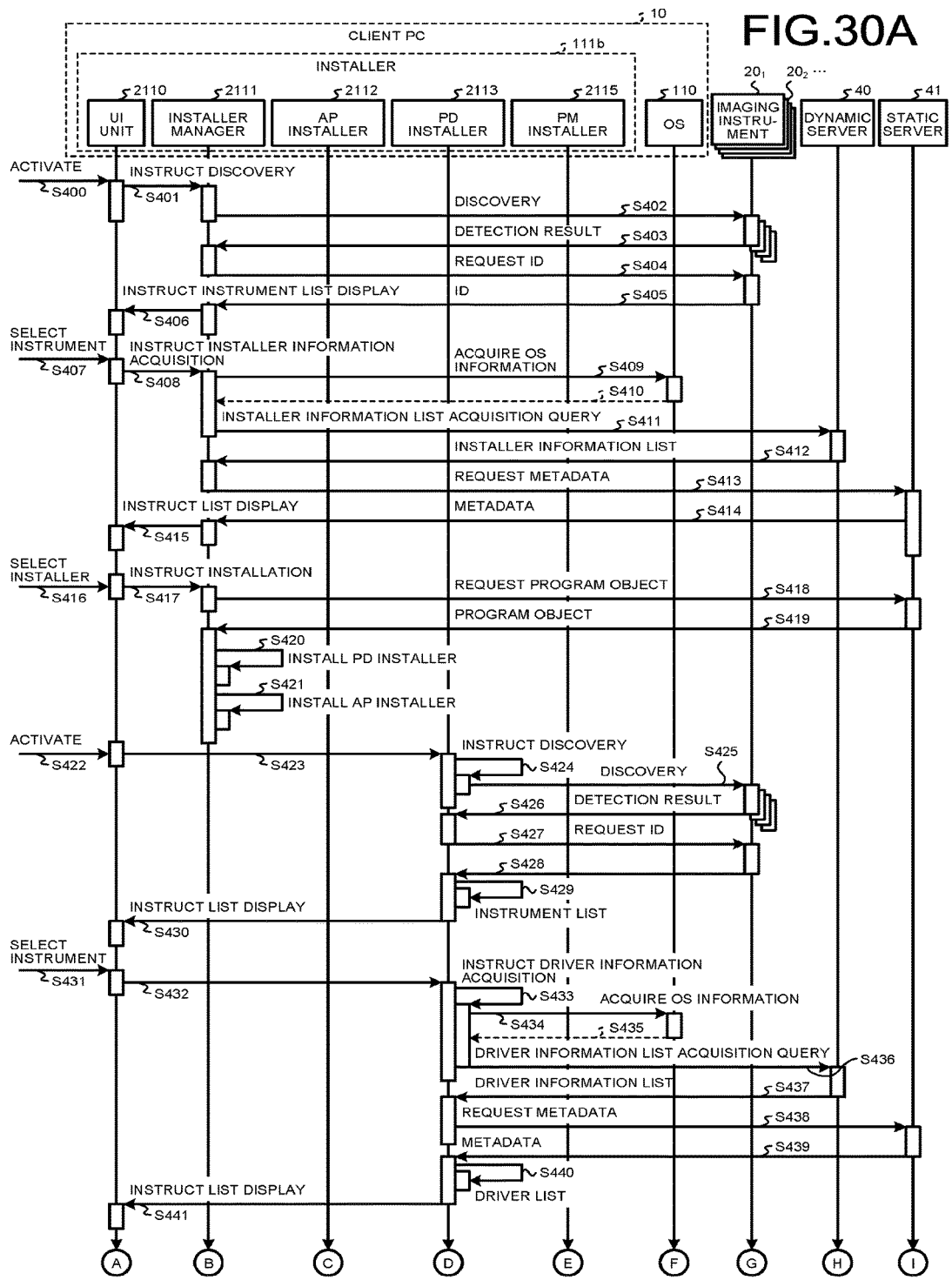
FIG. 30A is a sequence diagram illustrating exemplary processing at the entire information processing system in the installation processing according to the third embodiment.

FIGS. 30A and 30B are each a sequence diagram illustrating exemplary processing at the entire information processing system in the installation processing according to the third embodiment. In FIGS. 30A and 30B, the same part as in FIGS. 1, 5, and 25 described above is denoted by an identical reference sign, and detailed description thereof will be omitted. Reference signs "A" to "I" in FIGS. 30A and 30B indicate that the process proceeds between corresponding reference signs in FIGS. 30A and 30B.

The following describes an example in which a printer driver is newly installed on the client PC 10. In this example, the PD installer 2113 for installing this printer driver is yet to be installed on the client PC 10. A port monitor is needed to install this printer driver, but the port monitor and the PM installer 2115 for installing the port monitor are not installed on the client PC 10.

For example, activation of the installer 111b is instructed through a user operation on the client PC 10. The UI unit 2110 of the installer 111b is notified of this activation instruction (step S400). The UI unit 2110 instructs the installer manager 2111 to perform discovery of any external instrument connected with the network 22 in the same segment as the client PC 10 (step S401). In response to this instruction, the installer manager 2111 performs an external instrument search operation (discovery) over the network 30 at step S402.

Having received a result detection of the external instrument search (step S403), the installer manager 2111 requests model specification information from detected external instruments (the imaging instruments 201, 202, ... ) (step S404). The installer manager 2111 receives the model specification information transmitted from each external instrument in response to this request (step S405). The installer manager 2111 instructs the UI unit 2110 to display an instrument list for selecting an external instrument based on the received model specification information of each external instrument (step S406). In response to this instruction, the UI unit 2110 produces an instrument list display screen as described above, for example, and passes the screen to the display unit 101. The instrument list display screen may be the instrument list display screen 200 illustrated in FIG. 12.

When model specification information is selected through a user operation in response to the instrument list display screen (step S407), the UI unit 2110 instructs the installer manager 2111 to acquire installer information corresponding to the selected model specification information, (step S408). The installer manager 2111 requests acquisition of OS information from the OS 110 in accordance with this instruction (step S409). The OS 110 returns the OS information in response to this request (step S410).

Subsequently, at step S411, the installer manager 2111 produces a query to acquire an installer information list based on the model specification information acquired at steps S404 and S405 and the OS information acquired at steps S409 and S410, and transmits the query to the dynamic server 40 (the transmission unit, the first processing unit). At step S412, the dynamic server 40 searches the database in accordance with this query, and returns an installer information list obtained through the search to the installer manager 2111 (the first specification unit).

FIG. 31 illustrates an exemplary query applicable to the third embodiment produced by the installer manager 2111 and transmitted to the dynamic server 40 at step S411. In the query illustrated in FIG. 31, the third to the tenth lines are same as the second to the ninth lines of the query illustrated in FIG. 13, describing instrument specification information "MFP Model A" and OS information. The query illustrated in FIG. 31 includes the item "installer" on the second line in addition to the query illustrated in FIG. 13, and the value of the item "installer" is the value "installer manager" indicating the installer manager 2111. This description of the item "installer" allows the dynamic server 40 to select and acquire a program installer in which the installer manager 2111 is specified as an installer.

Similarly to the first embodiment, the dynamic server 40 searches the database described with reference to FIG. 8 in accordance with this query, and extracts a record matching with each piece of information described in the query. When a plurality of records are extracted in accordance with the query, the dynamic server 40 transmits information of items of each of the extracted records to the installer manager 2111 as an installer information list for the record (the first provision unit).

FIG. 32 illustrates an exemplary installer information list transmitted from the dynamic server 40 according to the third embodiment. As illustrated in FIG. 32, similarly to the program information illustrated in FIG. 14, the installer information list describes one piece of installer information between each pair of brackets "{" and "}" inside outermost brackets "[" and "]" on lines with line numbers "1" and "38". In the example illustrated in FIG. 32, four pieces of installer information (1) to (4) are described.

In the example illustrated in FIG. 32, each piece of installer information has a configuration obtained by omitting the item "metadata_url" from the corresponding piece of program information illustrated in FIG. 14. Alternatively, similarly to FIG. 14, the item "metadata_url" may be added to the installer information illustrated in FIG. 32.

In addition, in the example illustrated in FIG. 32, the item "id" on the first line of each piece of installer information (the third line, the twelfth line, the twenty-first line, and the thirtieth line) indicates the kind of computer program, and has a value indicating a program installer in this example. For example, in FIG. 32, in the first installer information (1), the item "id" has the value "printer_driver_installer" (refer to the third line), indicating that the installer information is installer information of the PD installer 2113. In the second installer information (2), the item "id" has the value "port-monitor_installer" (refer to the twelfth line), indicating that the installer information is installer information of the PM installer 2115.

Similarly, the third and the fourth installer information (3) and (4) indicate that the installer information is installer information of the AP installer 2112 and the SD installer 2114, respectively (the twenty-first line and the thirtieth line).

In each of the installer information (1) to (4), the item "installer" has the value "installer_manager", indicating that the program installers described in the installer information (1) to (4) are installed on the installer manager 2111.

At step S413, the installer manager 2111 requests metadata from the static server 41 based on the installer information acquired at step S412 list described above. The static server 41 transmits the metadata to the installer manager 2111 in response to this request (step S414). In the example illustrated in FIG. 32, the installer information list includes no information indicating whereabouts of metadata, and thus the installer manager 2111 does not request metadata.

The installer manager 2111 instructs the UI unit 2110 to display an installable program installer list based on the installer information list acquired at step S412 and the metadata acquired at step S414 (step S415). In response to this instruction, the UI unit 2110 generates an installable program installer list display screen based on the information passed from the installer manager 2111, and passes the screen to the display unit 101.

FIG. 33 illustrates an exemplary installable program installer list display screen according to the third embodiment. In FIG. 33, a display area 2211 and a button 2216 are arranged on a list display screen 2210. The display area 2211 includes a list display part 2212, a current version display part 2213, a new version display part 2214, and a selection input part 2215.

The list display part 2212 displays a list of program installers included in the installable program installer list passed from the installer manager 2111 at step S415. The current version display part 2213 and the new version display part 2214 display the installed version and the latest version, respectively, of each program installer displayed in the list display part 2212. The current version display part 2213 displays, for example, information indicating a not-installed state for any program installer not installed on the client PC 10 among the program installers displayed on the list display part 2212.

The selection input part 2215 is provided to allow selection of a program installer to be installed from among the program installers displayed in the list display part 2212. In this example, check boxes are provided in the selection input part 2215. When operated, the button 2216 fixes selection input on the selection input part 2215.

In this example, as exemplarily illustrated in FIG. 33, the PD installer 2113 and the AP installer 2112 are selected as program installers to be installed.

In FIG. 30A, a program installer to be installed is selected through a user operation in response to the list display screen 2210, and the UI unit 2110 is instructed to perform installation of the selected program installer (step S416). In response to this instruction, the UI unit 2110 passes information indicating the selected program installer to the installer manager 2111, and instructs the installer manager 2111 to execute installation of the selected program installer (step S417).

In response to this instruction, the installer manager 2111 refers to the installer information (i) for each selected program installer, to request a program object from the static server 41 in accordance with the value of the item "download_url" in the installer information (i) of the installation target (step S418). The static server 41 transmits the program object to the installer manager 2111 in response to this request (step S419). In this example, program objects of the PD installer 2113 and the AP installer 2112 selected on the list display screen 2210 are transmitted to the installer manager 2111.

The installer manager 2111 executes installation of the PD installer 2113 and the AP installer 2112 using the program objects acquired at step S419 (steps S420 and S421).

The processing at steps S400 to S421 corresponds to the processing of the flowchart illustrated in FIG. 28 described above.

Step S422 and the subsequent steps describe processing when the PD installer 2113 is activated. As described above, when the PD installer 2113 installs a driver program, a port monitor program is needed as a related computer program, but the port monitor program and the PM installer 2115 for installing the port monitor program are not initially installed on the client PC 10.

At step S422, activation of the PD installer 2113 is instructed through, for example, a user operation on the client PC 10, and the PD installer 2113 is notified of an activation instruction (step S423). In response to this notification, the PD installer 2113 is instructed to perform discovery of any external instrument (step S424). In accordance with this discovery instruction, the PD installer 2113 executes search of any external instrument connected with the network 22 in the same segment as the client PC 10 (step S425).

Having received a result detection of the external instrument search (step S426), the PD installer 2113 requests model specification information from detected external instruments (the imaging instruments 201, 202, . . . ) (step S427). The PD installer 2113 receives the model specification information transmitted from each external instrument in response to this request (step S428). The PD installer 2113 generates instrument list information based on the received model specification information of each external instrument (step S429).

The PD installer 2113 passes the generated instrument list information to the UI unit 2110, and instructs the UI unit 2110 to display an instrument list for selecting an external instrument (step S430). The UI unit 2110 produces an instrument list display screen in response to this instruction, and passes the instrument list display screen to the display unit 101. The instrument list display screen may be, for example, the instrument list display screen 200 described with reference to FIG. 12.

When a model is selected through a user operation in response to the instrument list display screen (step S431), the UI unit 2110 instructs the PD installer 2113 to acquire driver information corresponding to the selected model (step S432). The PD installer 2113 starts processing of acquiring the driver information in accordance with this instruction (step S433). The PD installer 2113 first requests acquisition of OS information from the OS 110 (step S434). The OS 110 returns the OS information in response to this request (step S435).

Subsequently, the PD installer 2113 produces a query to acquire a driver information list based on the model specification information acquired at steps S427 and S428 and the OS information acquired at steps S434 and S435, and transmits the query to the dynamic server 40 (step S436). At step S437, the dynamic server 40 searches the database in accordance with this query returns a driver information list obtained through the search to the PD installer 2113 (the second specification unit).

FIG. 34 illustrates an exemplary query applicable to the third embodiment produced by the PD installer 2113 and transmitted to the dynamic server 40 at step S436. The query illustrated in FIG. 34 includes the item "installer" on the second line in addition to the query illustrated in FIG. 13, and the value of the item "installer" is the value "printer_driver_installer" indicating the PD installer 2113. This allows the dynamic server 40 to select and acquire a program installer in which the PD installer 2113 is specified as an installer.

FIG. 35 illustrates an exemplary driver information list returned to the PD installer 2113 at step S437 according to the third embodiment. In FIG. 35, the driver information list corresponds to the driver information list illustrated in FIG. 14, and includes the items "id", "name", "version", "date", "size", "installer", "metadata_url", and "download_url".

The PD installer 2113 requests metadata from the static server 41 in accordance with the value of the item "metadata_url" in the program information list returned from the dynamic server 40 at step S437 (step S438). The static server 41 transmits the metadata to the PD installer 2113 in response to this request (step S439).

FIG. 36 illustrates exemplary metadata applicable to the third embodiment transmitted to the PD installer 2113 at step S439. In the example illustrated in FIG. 36, similarly to FIG. 15 described above, the metadata describes identification information of a sub instrument (the second to the sixth lines). The metadata illustrated in FIG. 36 includes the item "requirement" in addition to the configuration illustrated in FIG. 15.

The item "requirement" describes information necessary for using a computer program corresponding to the metadata. In the example illustrated in FIG. 36, the item "requirement" has the value "printer_driver_installer" and the value "portmonitor_filter_a" each indicating the kind of computer program. The value "printer_driver_installer" is associated with the value "version: 2.0.0.0", and the value "portmonitor_filter_a" is associated with the value "version: 1.0.0.0" and the value "installer: portmonitor_installer".

In other words, the value "printer_driver_installer" and the value associated with the value "printer_driver_installer" indicate that the PD installer 2113 a version of which is "2.0.0.0" or later is needed to use the computer program corresponding to the metadata. The value "portmonitor_filter_a" and the values associated with the value "portmonitor_filter_a" indicate that a port monitor filter program as a related computer program, a version of which is "1.0.0.0" or later, the PM installer 2115 for installed this port monitor filter program are needed to use the corresponding computer program.

The PD installer 2113 generates installable driver program list information based on the OS information acquired at step S435, the driver information list acquired at step S437, and the metadata acquired at step S439 (step S440). The PD installer 2113 passes the generated driver program list information to the UI unit 2110, and instructs the UI unit 2110 to display a driver list for selecting any driver program to be installed (step S441). In response to this instruction, the UI unit 2110 produces a driver list display screen, and passes the screen to the display unit 101.

Figure 37:
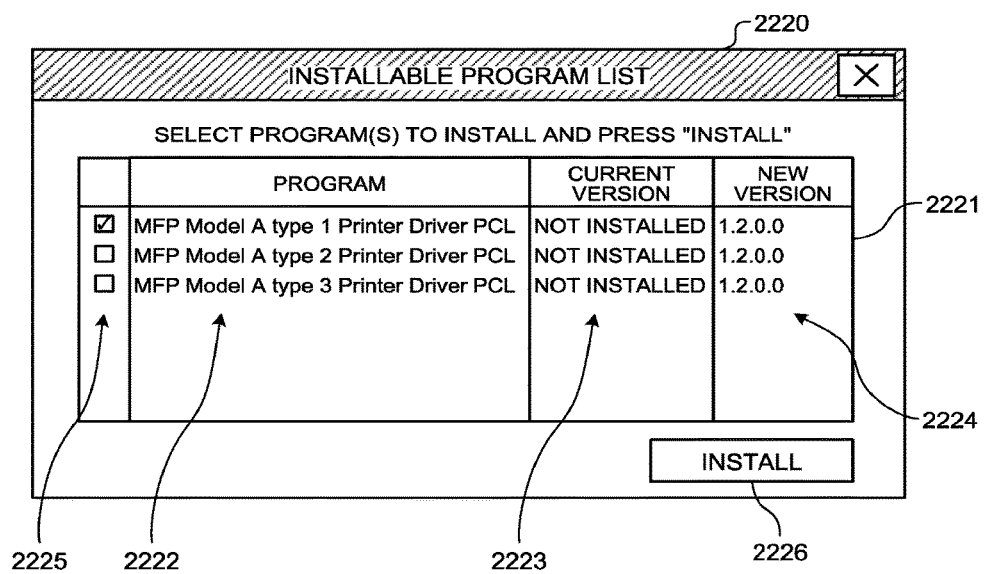
FIG. 37 is a diagram illustrating an exemplary driver list display screen applicable to the third embodiment.

FIG. 37 illustrates an exemplary driver list display screen applicable to the third embodiment. A driver list display screen 2220 illustrated in FIG. 37 is based on the driver information list illustrated in FIG. 35 described above and the metadata illustrated in FIG. 36. In other words, the driver list display screen 2220 is configured to allow selection of a driver program corresponding to each sub instrument described in the metadata (refer to FIG. 36) acquired at steps S438 and S439 in accordance with the item "metadata_url" included in the driver information list.

More specifically, a display area 2221 and a button 2226 are arranged on the driver list display screen 2220. The display area 2221 includes a list display part 2222, a current version display part 2223, a new version display part 2224, and a selection input part 2225.

The list display part 2222 displays a list of installable driver programs. In this example, the list displays any driver program corresponding to each sub instrument described in the metadata (refer to FIG. 36) acquired at steps S438 and S439. The current version display part 2223 and the new version display part 2224 display the installed version and the latest version, respectively, of each driver program displayed on the list display part 2222. The current version display part 2223 displays, for example, information indicating a not-installed state for any driver program not installed on the client PC 10 among the driver programs displayed in the list display part 2222.

The selection input part 2225 is provided to allow selection of a program installer to be installed from among the driver programs displayed in the list display part 2222. In this example, check boxes are provided in the selection input part 2225. When operated, the button 2226 fixes selection input on the selection input part 2225.

In this example, as exemplarily illustrated in FIG. 37, one of driver programs correspondence to sub instruments is selected as a driver program to be installed.

The following describes a sequence diagram illustrated in FIG. 30B. A driver program to be installed is selected through a user operation in response to the driver list display screen 2220, and the UI unit 2110 is instructed to perform installation of the selected driver program (step S450). In response to this instruction, the UI unit 2110 passes information indicating the selected driver program to the PD installer 2113, and instructs the PD installer 2113 to execute installation of the selected driver program (step S451).

In response to this instruction, the PD installer 2113 determines whether the PD installer 2113 needs to be updated (step S452). For example, the PD installer 2113 compares the version of the PD installer 2113 with a version required for the PD installer 2113 in information included in the metadata acquired at step S439 to determine whether the PD installer 2113 needs to be updated.

In this example, the installer information list illustrated in FIG. 32 and the metadata illustrated in FIG. 36 indicate that the version of the PD installer 2113 is "1.0.0.0" and the version of the PD installer 2113 required for installation of the selected driver program is "2.0.0.0", and thus the PD installer 2113 needs to be updated. Accordingly, the PD installer 2113 requests the installer manager 2111 to update the PD installer 2113 (step S453).

The installer manager 2111 instructs the installer manager 2111 itself to acquire installer information in response to the update request from the PD installer 2113 (step S454). Similarly to processing at steps S409 to S414 described above, the installer manager 2111 acquires OS information (steps S455 and S456), and transmits the query illustrated in FIG. 31 to the dynamic server 40 (step S457). The dynamic server 40 searches the database in accordance with this query, and obtains installer information as a result of the search (the second provision unit). The installer manager 2111 acquires an installer information list from the dynamic server 40 (step S458), and acquires metadata from the static server 41 (steps S459 and S460).

FIG. 38 illustrates an exemplary installer information list acquired from the dynamic server 40 at step S458 according to the third embodiment. The installer information list illustrated in FIG. 38 has a configuration same as the installer information list produced with reference to FIG. 32, and thus detailed description thereof will be omitted below. In the example illustrated in FIG. 38, the value "printer_driver_installer" of the item "id" indicating the kind of computer program on the second line to the tenth line, and the values of the item "version" on the fifth line and the item "download_url" on the ninth line indicate that the PD installer 2113 a version of which is "2.0.0.0" is located at a place described in the item "download_url".

The installer manager 2111 acquires, based on these acquired values, a program object for updating the PD installer 2113 from the static server 41.

When the installer information list and the metadata are acquired, the installer manager 2111 stops the PD installer 2113 currently being activated (step S461). Thereafter, the installer manager 2111 updates the PD installer 2113 through the program object for updating the PD installer 2113 acquired from the static server 41. For example, the installer manager 2111 overwrites the existing PD installer 2113 with this program object to execute the update of the PD installer 2113 (step S462).

The installer manager 2111 activates the updated PD installer 2113 (step S463). Then, the activated PD installer 2113 instructs the installer manager 2111 to perform installation of the PM installer 2115 in accordance with description (refer to FIG. 36) of the value "installer: portmonitor_installer" indicating a related computer program in the metadata acquired by the installer manager 2111 at step S439 (step S464). In accordance with this instruction, the installer manager 2111 acquires a program object of the PM installer 2115 from the static server 41 based on the installer information list acquired at step S458 (steps S465 and S466).

In the example illustrated in FIG. 38, the item "id" has the value "portmonitor_installer" on the eleventh first to the nineteenth lines, describing information on the PM installer 2115. The installer manager 2111 acquires the program object of the PM installer 2115 from the static server 41 in accordance with the value of the item "download_url".

The installer manager 2111 installs the PM installer 2115 on the client PC 10 through the program object acquired at step S466 (step S467). When the installation of the PM installer 2115 is completed, the installer manager 2111 notifies the PD installer 2113 of the installation completion (step S468).

Having received the notification of the installation completion of the PM installer 2115 from the installer manager 2111, the PD installer 2113 instructs the PM installer 2115 to install a port monitor in accordance with description (refer to FIG. 36) of the value "portmonitor_filter_a" indicating a related computer program in the metadata acquired by the PD installer 2113 at step S439 (step S469). The PM installer 2115 starts processing of installing the port monitor in response to this instruction.

Specifically, similarly to, for example, steps S433 to S439 described above, the PM installer 2115 instructs the PM installer 2115 itself to acquire driver information in response to the instruction to install the port monitor (step S470). In accordance with this instruction, the PM installer 2115 acquires OS information (steps S471 and S472), and transmits a query to the dynamic server 40 (step S473).

FIG. 39 illustrates an exemplary query applicable to the third embodiment produced by the PM installer 2115 and transmitted to the dynamic server 40 at step S473. The query illustrated in FIG. 39 is same as the query illustrated in FIG. 34 except that the item "installer" on the second line in the query illustrated in FIG. 34 is replaced with the item "id". In the query illustrated in FIG. 39, the item "id" has the value "portmonitor_filter_a", uniquely identifying driver information to be acquired by the query. In this manner, when the item "id" is specified in the query, driver information matching with the value of the item "id" is returned as a result of the query.

The PM installer 2115 acquires a list of the driver information transmitted from the dynamic server 40 in response to this query (step S474). FIG. 40 illustrates an exemplary driver information list acquired at step S474 according to the third embodiment. In the example illustrated in FIG. 40, similarly to the program information list illustrated in FIG. 35, the driver information list includes the items "id", "name", "version", "date", "size", "installer", "metadata_url", and "download_url".

The PM installer 2115 acquires metadata from the static server 41 based on the acquired driver information list (steps S475 and S476). Then, the PM installer 2115 acquires a program object of the port monitor from the static server 41 in accordance with the acquired driver information list and metadata (steps S477 and S478), and installs the port monitor on PC 10 (step S479).

When the installation of the port monitor is completed, the PM installer 2115 notifies the PD installer 2113 of the installation completion (step S480). In response to this notification, the PD installer 2113 acquires a program object of a printer driver from the static server 41 based on the driver information list and metadata acquired at steps S436 to S439 described above (steps S481 and S482). Then, the PD installer 2113 installs the printer driver on the client PC 10 through the acquired program object (step S483).

When the installation of the printer driver is completed, the PD installer 2113 notifies the UI unit 2110 of the completion (step S484). In response to this notification of the installation completion, the UI unit 2110 causes, for example, the display unit 101 to display the completion of the processing of installing the printer driver.

After the processing up to step S484 is completed, for example, the user performs printing request to the printer driver "MFP Model A type1 Printer Driver PCL" (refer to FIGS. 35 and 37) on a document application program mounted on the client PC 10. In this case, the printer driver "MFP Model A type1 Printer Driver PCL" can generate printing data that can be processed by an instrument corresponding to the printer driver "MFP Model A type1 Printer Driver PCL", and transmit an instruction to print the printing data to the corresponding instrument using the port monitor "Port Monitor Filer A" installed through the processing at steps S469 to S480.

The preferred embodiments of the present invention are described above, but the present invention is not limited thereto. Various kinds of modifications are possible without departing from the scope of the present invention.

An embodiment can facilitate installation of a plurality of computer programs, installation methods of which are different from each other.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

REFERENCE SIGNS LIST 10 client PC
$20_1$, $20_2$ imaging instrument
40 dynamic server
41 static server
101 display unit
102 input unit
110 OS
111, 111a, 111b installer
200 instrument list display screen
210, 2210 list display screen
1110, 2110 UI unit
1111, 2111 installer manager
1112, 2112 AP installer
1113, 2113 PD installer
1114, 2114 SD installer
1115, 2115 PM installer
2220 driver list display screen

What is claimed is:

1. A system comprising:
a terminal;
a server system comprising:
server circuitry configured to:
connect with the terminal through a network,
provide two or more first computer programs configured to allow the terminal to execute processing on a device connected with the terminal through the network,
store the two or more first computer programs and two or more second computer programs in a memory,
specify a second computer program of the two or more second computer programs to be provided to the terminal based on terminal information on the terminal received from the terminal,
provide the second computer program specified to the terminal,
specify the two or more first computer programs to be provided to the terminal based on device information on the device received from the terminal, by the terminal executing the second computer program, and
provide the two or more first computer programs specified to the terminal; and
the terminal comprising:
a transmitter configured to transmit the terminal information to the server system; and
processing circuitry configured to execute the second computer program to:
acquire the device information on the device and transmit the acquired device information to the server system, and
install the two or more first computer programs provided by the server system, on the terminal, by execution of the second computer program, the two or more first computer programs including an application program and a driver program, and the second computer program being a single installer program.

2. The system according to claim 1, wherein the processing circuitry is further configured to execute, when the second computer program provided by the server system is the single installer program enabling the terminal to execute installation of the first computer program in accordance with a kind of the first computer program and the terminal does not include the single installer program, installation of the single installer program in response to a user instruction.

3. The system according to claim 1, wherein the device information further includes information indicating meta information of the device information, in a format defined in accordance with information included in the device information and indicating a kind, the processing circuitry is further configured to:
acquire the meta information based on the device information, and
execute installation of the first computer program provided by the server system in accordance with the meta information acquired.

4. The system according to claim 3, wherein the meta information includes information indicating the two or more first computer programs, the processing circuitry is further configured to acquire a computer program selected based on the information indicating the two or more first computer programs included in the meta information.

5. The system according to claim 3, wherein the first computer program is the driver program enabling the terminal to achieve a function of a driver for controlling an external instrument, the meta information includes information indicating sub models of a model corresponding to the driver program,
the processing circuitry is further configured to acquire the first computer program for the sub models included in the meta information.

6. The system according to claim 1, wherein the device information further includes version information indicating a version of a computer program, the processing circuitry is further configured to compare a first version indicated by the version information included in device information corresponding to the computer program acquired, and a second version of the computer program corresponding to the acquired computer program, among computer programs already installed on the terminal, and execute installation of the acquired first computer program when the first version is newer than the second version.

7. The system according to claim 1, wherein the processing circuitry is further configured to cause to display the device information acquired, and execute installation of the first computer program corresponding to device information selected in response to the display.

8. The system according to claim 1, wherein the processing circuitry is further configured to:
acquire model identification information identifying a model of an external instrument, and system identification information identifying an operation system operating on the terminal, and
acquire the device information based on the model identification information and the system identification information, cause to display information indicating the model identification information, and acquire the device information corresponding to model identification information selected in response to the display among the acquired model identification information.

9. The system according to claim 1, wherein the device information further includes related program information indicating a related computer program necessary for installation of the first computer program, the processing circuitry is further configured to execute processing of installing the related computer program acquired based on the related program information.

10. The system according to claim 9, wherein the processing circuitry is executed by another processing circuitry.

11. The system according to claim 1, wherein the server circuitry is further configured to store the two or more second computer programs for installing two or more first computer programs for controlling two or more different models of apparatuses, procedures of installation in the two or more second computer programs being different from each other.

12. An information processing method comprising:
connecting a server system with a terminal through a network;
providing two or more first computer programs, by the server system, the two or more computer programs configured to allow the terminal to execute processing on a device connected with the terminal through the network;
storing the two or more first computer programs and two or more second computer programs in a memory;
specifying a second computer program of the two or more second computer programs to be provided to the terminal based on terminal information on the terminal received from the terminal;
providing the second computer program specified to the terminal;

specifying the two or more first computer programs to be provided to the terminal based on device information on the device received from the terminal, by the terminal executing the second computer program;
providing the two or more first computer programs specified to the terminal;
transmitting the terminal information to the server system;
acquiring the device information on the device and transmitting the acquired device information to the server system; and
installing the two or more first computer programs provided by the server system, on the terminal, by execution of the second computer program, the two or more first computer programs including an application program and a driver program, and the second computer program being a single installer program.

13. A non-transitory computer-readable storage medium storing a computer program configured to cause a computer to execute:
connecting a server system with a terminal through a network;
providing two or more first computer programs, by the server system, the two or more computer programs configured to allow the terminal to execute processing on a device connected with the terminal through the network;
storing the two or more first computer programs and two or more second computer programs in a memory,
specifying a second computer program of the two or more second computer programs to be provided to the terminal based on terminal information on the terminal received from the terminal;
providing the second computer program specified to the terminal;
specifying the two or more first computer programs to be provided to the terminal based on device information on the device received from the terminal, by the terminal executing the second computer program;
providing the two or more first computer programs specified to the terminal;
transmitting the terminal information to the server system;
acquiring the device information on the device and transmitting the acquired device information to the server system; and
installing the two or more first computer programs provided by the server system, on the terminal, by execution of the second computer program, the two or more first computer programs including an application program and a driver program, and the second computer program being a single installer program.

14. The non-transitory computer-readable storage medium according to claim 13, wherein executing, when the second computer program provided by the server system is the single installer program enabling the terminal to execute installation of the first computer program in accordance with a kind of the first computer program and the terminal does not include the single installer program, installation of the single installer program in response to a user instruction.

* * * * *